US008233205B2

(12) United States Patent
Ayres

(10) Patent No.: US 8,233,205 B2
(45) Date of Patent: Jul. 31, 2012

(54) METHOD FOR HOLOGRAPHIC DATA RETRIEVAL BY QUADRATURE HOMODYNE DETECTION

(75) Inventor: Mark R. Ayres, Boulder, CO (US)

(73) Assignee: InPhase Technologies, Inc., Longmont, CO (US)

( * ) Notice: Subject to any disclaimer, the term of this patent is extended or adjusted under 35 U.S.C. 154(b) by 0 days.

(21) Appl. No.: 12/576,257

(22) Filed: Oct. 9, 2009

(65) Prior Publication Data

US 2010/0020669 A1    Jan. 28, 2010

Related U.S. Application Data

(62) Division of application No. 11/562,533, filed on Nov. 22, 2006, now Pat. No. 7,623,279.

(60) Provisional application No. 60/738,597, filed on Nov. 22, 2005.

(51) Int. Cl.
G03H 1/00 (2006.01)
G03H 1/26 (2006.01)
G03H 1/22 (2006.01)
G06K 9/40 (2006.01)

(52) U.S. Cl. ............... 359/22; 359/1; 359/32; 382/254

(58) Field of Classification Search ............... None
See application file for complete search history.

(56) References Cited

U.S. PATENT DOCUMENTS

| | | | |
|---|---|---|---|
| 5,058,124 A | 10/1991 | Cameron et al. | |
| 5,491,570 A | 2/1996 | Rakuljic et al. | |
| 6,047,008 A | 4/2000 | Funakawa | |
| 6,103,454 A | 8/2000 | Dhar et al. | |
| 6,414,763 B1 | 7/2002 | Hesselink et al. | |
| 6,449,627 B1 | 9/2002 | Baer et al. | |
| 6,480,513 B1 | 11/2002 | Kapany et al. | |
| 6,482,551 B1 | 11/2002 | Dhar et al. | |
| 6,597,711 B2 | 7/2003 | Fernald et al. | |
| 6,614,566 B1 | 9/2003 | Curtis et al. | |
| 6,650,447 B2 | 11/2003 | Curtis et al. | |
| 6,673,497 B2 | 1/2004 | Efimov et al. | |
| 6,743,552 B2 | 6/2004 | Setthachayanon et al. | |
| 6,765,061 B2 | 7/2004 | Dhar et al. | |
| 6,768,839 B2 | 7/2004 | Blomquist et al. | |
| 6,780,546 B2 | 8/2004 | Trentler et al. | |
| 6,920,159 B2 | 7/2005 | Sidorin et al. | |
| 7,027,469 B2 | 4/2006 | Sidorin et al. | |
| 7,065,032 B2 | 6/2006 | Horimai | |
| 7,092,133 B2 | 8/2006 | Anderson et al. | |
| 2003/0206320 A1 | 11/2003 | Cole et al. | |
| 2004/0027625 A1 | 2/2004 | Trentler et al. | |
| 2004/0085599 A1* | 5/2004 | Kim ..................... | 359/35 |
| 2005/0134948 A1 | 6/2005 | Waldman et al. | |
| 2005/0286387 A1 | 12/2005 | Ayres et al. | |
| 2005/0286388 A1 | 12/2005 | Ayres et al. | |
| 2006/0281021 A1 | 12/2006 | Riley et al. | |

* cited by examiner

Primary Examiner — Jade R Chwasz
(74) Attorney, Agent, or Firm — Vedder Price P.C.; Ajay A. Jagtiani

(57) ABSTRACT

A holographic device is provided for recovering data in a holographic memory system. The device use homodyne detection to introduce a local oscillator beam into a reconstructed data beam of the recovered hologram. An image of the combined beam comprising the reconstructed data beam and local oscillator beam may be processed to obtain contrast level information for the pixels of the detected image. This contrast level information may then be used to obtain an increased contrast image of the recovered hologram, which may increase the signal to noise ratio (SNR) of the recovered data.

24 Claims, 12 Drawing Sheets

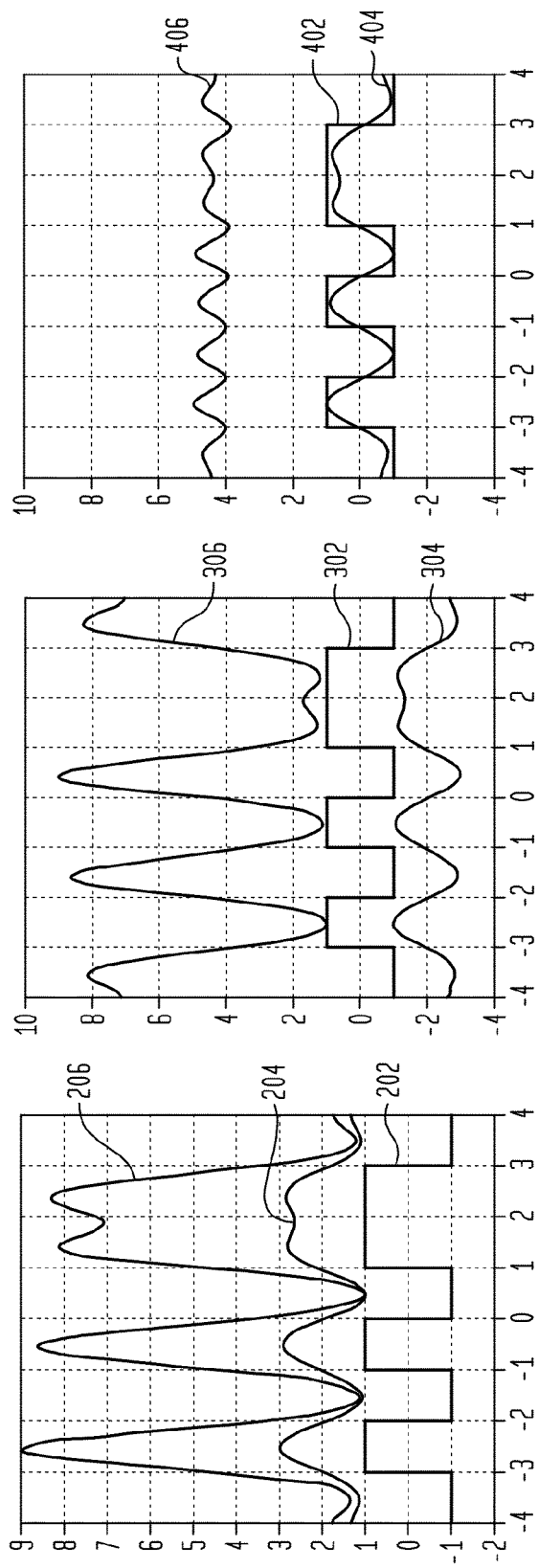

CAMERA IMAGE P

CAMERA IMAGE Q

QUADRATURE COMBINED IMAGE

METHOD FOR HOLOGRAPHIC DATA RETRIEVAL BY QUADRATURE HOMODYNE DETECTION

CROSS-REFERENCE TO RELATED APPLICATIONS

This divisional application claims benefit of priority to U.S. application Ser. No. 11/562,533, entitled "Method For Holographic Data Retrieval By Quadrature Homodyne Detection," filed on Nov. 22, 2006 now U.S. Pat. No. 7,623,279, which claims the benefit of priority to U.S. Provisional Patent Application No. 60/738,597 filed Nov. 22, 2005. The entire disclosure and contents of the foregoing Provisional Application is hereby incorporated by reference. This application also makes reference to the following co-pending U.S. patent applications. The first application is U.S. application Ser. No. 10/879,847, entitled "Method and System for Equalizing Holographic Data Pages," filed Jun. 28, 2004. The second application is U.S. application Ser. No. 11/069,007, entitled "Processing Data Pixels in a Holographic Data Storage System," filed Feb. 28, 2005. The entire disclosure and contents of the foregoing U.S. patent applications are hereby incorporated by reference.

BACKGROUND

1. Field of the Invention

The present invention relates broadly to holographic memory systems, and more particularly to methods and systems for holographic data retrieval.

2. Related Art

Developers of information storage devices continue to seek increased storage capacity. As part of this development, memory systems employing holographic optical techniques, referred to as holographic memory systems, have been suggested as alternatives to conventional memory devices.

Holographic memory systems may read/write data to/from a photosensitive storage medium. When storing data, holographic memory system often record the data by storing a hologram of a 2-dimension array, commonly referred to as a "page," where each element of the 2-D array is a single data bit. This type of system is often referred to as "page-wise" memory system. Holographic memory systems may store the holograms as a pattern of varying refractive index and/or absorption imprinted into the storage medium.

Holographic systems may perform a data write (also referred to as a data record or data store operation, simply "write" operation herein) by combining two coherent light beams, such as laser beams, at a particular point within the storage medium. Specifically, a data-encoded light beam is combined with a reference light beam to create an interference pattern in the photosensitive storage medium. The interference pattern induces material alterations in the storage medium to form a hologram.

Holographically-stored data may be retrieved from the holographic memory system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reference beam interact to reconstruct the data beam.

The reconstructed data beam may then be detected by a power-sensitive camera and processed for delivery to an output device. This detection mechanism may have several limitations. First, since hologram diffraction efficiency is driven to the lowest possible level in order to maximize the number of pages that may be stored, the read signals may be weak and require long exposure times to detect. Secondly, the laser light used to perform the read-out may be necessarily coherent, thus optical noise sources such as scatter and ISI (intersymbol interference, or pixel-to-pixel crosstalk from blur) may mix coherently with the desired optical signal, reducing signal quality when compared to additive noise of the same power. As such, there may be a need to improved the signal level of the detected hologram and improve the signal to noise ratio.

SUMMARY

According to a first broad aspect of the present invention, there is provided a method for use with a storage medium that holographically stores information, the method comprising the following steps:

(a) generating a reconstructed data beam by directing a first coherent light beam into a storage medium, wherein the first coherent light beam reproduces a reference beam used to holographically store information in the storage medium;

(b) obtaining a first image from a first combined beam produced by combining at least a portion of the reconstructed data beam with at least a portion of the second coherent light beam, wherein the reconstructed data beam and the second coherent light beam have a phase difference that is a first phase difference;

(c) obtaining a second image from a second combined beam produced by combining the reconstructed data beam with the second coherent light beam, wherein the phase difference of the reconstructed data beam and the second coherent light beam has been adjusted to produce a second phase difference;

(d) processing the first image and second image to obtain first image contrast information and second image contrast information; and (e) obtaining combined information from the first image and second image using the first image contrast information and the second image contrast information; and (f) processing the combined information to obtain the information holographically stored by the storage medium.

According to a second broad aspect of the present invention, there is provided a system for use with a storage medium that holographically stores information, the system comprising:

a light source which generates a first coherent light beam that is a reproduction of a reference beam used in holographically storing information in a storage medium and wherein the first coherent beam generates a reconstructed data beam from the storage medium;

a beam combiner which combines at least a portion of the reconstructed data beam with at least a portion of a second coherent light beam to produce a combined beam;

a camera which captures an image from the combined beam;

a phase retarder which causes a first phase difference and a second phase difference between the reconstructed data beam and the second coherent beam; and a processor which (a) directs the phase retarder to cause the first phase difference between the reconstructed data beam and the second coherent beam to obtain a first image from the camera of the combined beam when the reconstructed data beam and the second coherent beam have the first phase difference; (b) directs the phase retarder to cause the second phase difference between the reconstructed data beam and the second coherent beam to obtain a second image from the camera of the combined beam when the reconstructed data beam and the second coherent beam have the second phase difference; (c) processes the first image and second image to obtain first image contrast information and second image contrast information, (d) combines information from the first image and second image using the first image contrast information and the second image contrast information to obtain combined information; and (e) processes the combined information to obtain the information holographically stored by the storage medium.

According to a third broad aspect of the present invention, there is provided a system for use with a storage medium that holographically stores information, the system comprising:

means for generating a reconstructed data beam by directing a first coherent light beam into a storage medium, wherein the first coherent light beam reproduces a reference beam used to holographically store information in the storage medium;

means for obtaining a first image from a first combined beam produced by combining at least a portion of the reconstructed data beam with at least a portion of a second coherent light beam, wherein the reconstructed data beam and the second coherent light beam have a phase difference that is a first phase difference;

means for obtaining a second image from a second combined beam produced by combining the reconstructed data beam with the second coherent light beam, wherein the phase difference of the reconstructed data beam and the second coherent light beam has been adjusted to produce a second phase difference;

means for processing the first image and second image to obtain first image contrast information and second image contrast information; and means for obtaining combined information from the first image and second image using the first image contrast information and the second image contrast information; and means for processing the combined information to obtain the information holographically stored by the storage medium.

According to a fourth broad aspect of the present invention, there is provided a method for use with a storage medium that holographically stores information, the method comprising the following steps:

(a) generating a combined beam comprising a local oscillator portion and a reference pattern portion;
(b) causing the combined beam to contact the storage medium to thereby generate a reconstructed data beam;
(c) obtaining an image from the reconstructed data beam;
(d) processing the obtained image to provide image contrast information; and
(e) modifying the local oscillator portion of the combined beam based on the image contrast information.

According to a fifth broad aspect of the present invention, there is provided a system for use with a storage medium that holographically stores information, the system comprising:

a light source generating a first coherent light beam which reproduces a reference beam used in holographically storing information in a storage medium;
a spatial light modulator (SLM) which forms a combined beam from the first coherent light beam, wherein the SLM comprises a plurality of pixels which implement a format, wherein the format comprises a local oscillator portion and a reference pattern portion;
an optical steering subsystem which directs the first coherent light beam towards the storage medium to generate a reconstructed data beam;
a camera which obtains an image from the reconstructed data beam;
a processor which processes the obtained image to provide image contrast information and to direct the SLM to modify at least one pixel in the local oscillator portion based on the image contrast information.

According to a sixth broad aspect of the present invention, there is provided a system for use with a storage medium that holographically stores information, the system comprising:

means for generating a combined beam comprising a local oscillator portion and a reference pattern portion;
means for causing the combined beam to contact the storage medium to thereby generate a reconstructed data beam;
means for obtaining an image from the reconstructed data beam;
means for processing the obtained image to provide image contrast information; and
means for modifying the local oscillator portion of the combined beam based on the image contrast information.

According to a seventh broad aspect of the present invention, there is provided a method for use with a storage medium that holographically stores information, the method comprising the following steps:

(a) generating a reconstructed data beam by directing a first coherent light beam into a storage medium, wherein the first coherent light beam reproduces a reference beam used to holographically store information in the storage medium;
(b) generating a local oscillator beam comprising a phase modulation pattern;
(c) generating a combined beam comprising at least a portion of the local oscillator beam and at least a portion of the reconstructed data beam;
(d) obtaining an image from the combined beam;
(e) processing the obtained image to provide image contrast information; and
(f) modifying the phase modulation pattern of the local oscillator beam based on the image contrast information.

According to a eighth broad aspect of the present invention, there is provided a system for use with a storage medium that holographically stores information, the system comprising:

a light source generating a first coherent light beam which reproduces a reference beam used in holographically storing information in a storage medium and wherein the first coherent beam generates a reconstructed data beam from the storage medium;
an SLM which imparts a phase modulation pattern to a second coherent beam;
a beam combiner which combines at least a portion of the reconstructed data beam with at least a portion of a second coherent beam;
a camera which obtains an image from the combined beam; and
a processor which processes the obtained image to provide image contrast information and to direct the SLM to modify the phase modulation pattern based on the image contrast information According to a ninth broad aspect of the present invention, there is provided a system for use with a storage medium that holographically stores information, the system comprising:
   means for generating a reconstructed data beam by directing a first coherent light beam into a storage medium, wherein the first coherent light beam reproduces a reference beam used to holographically store information in the storage medium;
   means for generating a local oscillator beam comprising a phase modulation pattern;
   means for generating a combined beam comprising at least a portion of the local oscillator beam and at least a portion of the reconstructed data beam;
   means for obtaining an image from the combined beam;
   means for processing the obtained image to provide image contrast information; and
   means for modifying the phase modulation pattern of the local oscillator beam based on the image contrast information.

BRIEF DESCRIPTION OF THE DRAWINGS

The invention will be described in conjunction with the accompanying drawings, in which:

FIG. 2 illustrates exemplary signals where the local oscillator beam is coherent and phase-locked in time and phase matched in space with the reconstruction data beam, in accordance with embodiments of the invention;

FIG. 3 illustrates exemplary signals where the local oscillator beam and reconstructed data beam are 180 degrees out of phase in time, in accordance with embodiments of the invention;

FIG. 4 illustrates exemplary signals where the local oscillator beam and reconstructed data beam are 90 degrees out of phase in time, in accordance with embodiments of the invention;

DETAILED DESCRIPTION

Figure 1:
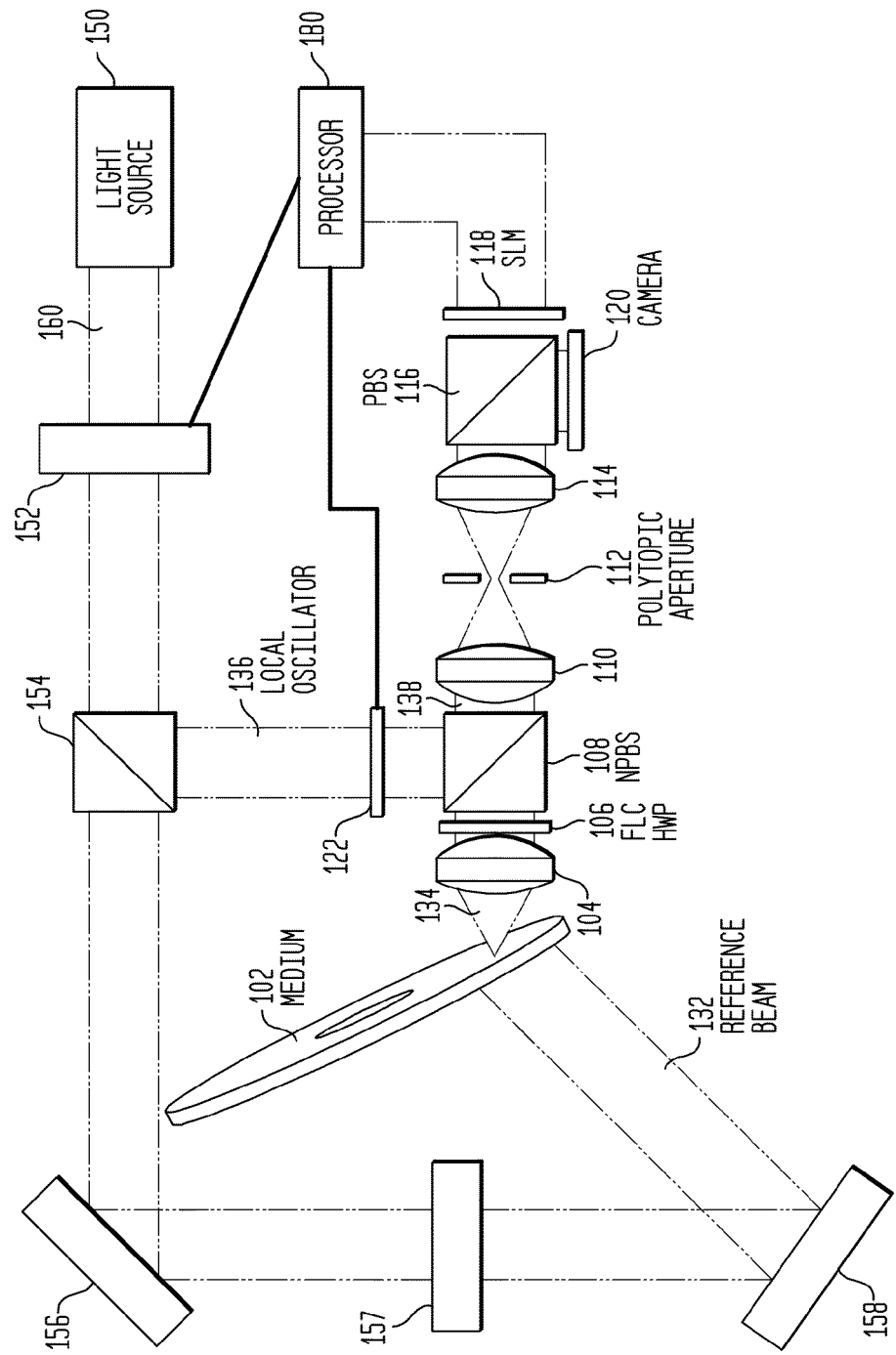
FIG. 1 illustrates a simplified diagram of a holographic memory system showing one way for introducing a local oscillator beam, in accordance with embodiments of the invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "holographic recording" refers to the act of recording a hologram in a holographic recording medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "storage medium" refers to any component, material, etc., capable of storing information, such as, for example a holographic storage medium.

For the purposes of the present invention, the term "holographic storage medium" refers to a component, material, etc., that is capable of recording and storing, in three dimensions (i.e., the X, Y and Z dimensions), one or more holograms (e.g., bit-wise, linear array-wise or page-wise) as one or more patterns of varying refractive index and/or absorption imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320, published Nov. 6, 2003, (Cole et al.), and U.S. Patent Application No. 2004-0027625 (Trentler et al.), published Feb. 12, 2004, the entire contents and disclosures of which are herein incorporated by reference.

For the purposes of the present invention, the term "data page" or "page" refers to the conventional meaning of data page as used with respect to holography. For example, a data page may be a page of data, one or more pictures, etc., to be recorded or recorded in a holographic medium.

For the purposes of the present invention, the term "recording light" refers to a light source used to record information, data, etc., into a holographic recording medium.

For the purposes of the present invention, the term "recording data" refers to storing or writing holographic data in a holographic medium.

For the purposes of the present invention, the term "reading data" refers to retrieving, recovering, or reconstructing holographic data stored in a holographic medium.

For the purposes of the present invention, the term "data modulator" refers to any device that is capable of optically representing data in one or two-dimensions from a signal beam.

For the purposes of the present invention, the term "spatial light modulator" (SLM) refers to a data modulator device that is an externally controlled, active optical element.

For the purposes of the present invention, the term "refractive index profile" refers to a three-dimensional (X, Y, Z) mapping of the refractive index pattern recorded in a holographic recording medium.

For the purposes of the present invention, the term "data beam" refers to a recording beam containing a data signal. As used herein, the term "data modulated beam" refers to a data beam that has been modulated by a modulator such as a spatial light modulator (SLM).

For the purposes of the present invention, the term "coherent light beam" refers to a beam of light including waves with a particular (e.g., constant) phase relationship, such as, for example, a laser beam.

For the purposes of the present invention, the term "reference beam" refers to a beam of light not including data. Exemplary reference beams include non-data bearing laser beams used while recording data to a holographic storage medium. For example, a reference beam may be used to create holographic fringes due to interference with a data beam during a write. Additionally, for example, the term "reference beam" may also be referred to as a probe beam during, for example, a data read.

For the purpose of the present invention, the term "reconstructed data beam" refers to a beam of light generated by a hologram stored by a storage medium and a reference beam interacting. Exemplary reconstructed data beams comprise a light beam that is a reconstruction of a data beam used when storing information in a holographic storage medium.

For the purpose of the present invention, the term "collinear holography" refers to a holographic storage technique in which a data beam and a reference beam are aligned on the same axis when holographically storing information in a storage medium.

For the purposes of the present invention, the term "off-axis holography" refers to a holographic storage technique in which a data beam and a reference beam are not aligned on the same axis when holographically storing information in a storage medium.

For the purpose of the present invention, the term "phase carrier" refers to a wavefront of an optical beam. Exemplary phase carriers may include a slowly-varying wavefront that would interfere constructively with all "+1" pixels of a data beam, and destructively with all "−1" pixels.

For the purpose of the present invention, the term "reserved block" refers to a region of known pixel patterns that are distributed throughout a data page. Exemplary reserved blocks include an 8×8 pattern including a pseudo-random pattern with desirable auto-correlation properties.

For the purpose of the present invention, the term "phase" refers to a position in the cycle of something that changes cyclically. For example, a sine wave may be expressed as $s(t)=A \sin(2\pi ft+\theta)$, where A=the amplitude of the wave, f=the frequency of the wave, t=the instantaneous time, and $\theta$=the phase of the wave. As used herein, exemplary phases, $\theta$, may be 0, 90 degrees, 180 degrees, −90 degrees, etc.

For the purpose of the present invention, the term "phase shift" refers to a constant difference/offset between two instantaneous phases. For example, two sine waves may have different phases, where the differences between these phases are referred to as the phase shift. For example, in one example the phase, $\theta_1$, of one wave may be 0 and the phase, $\theta_2$, of a second wave may be 90. In such, an example, the two waves will be referred to as having a phase shift of 90 degrees (i.e., $\theta_2-\theta_1=90$).

For the purpose of the present invention, the term "phase difference" refers to a difference between the phases of two waves. For example, in one example the phase, $\theta_1$, of one wave may be 0 and the phase, $\theta_2$, of a second wave may be 90. In such, an example, the two waves will be referred to as having a phase difference of 90 degrees (i.e., $\theta_2-\theta_1=90$).

For the purpose of the present invention, the term "image" refers to a two-dimensional optical irradiance pattern; or a representation thereof such as that captured by a camera.

For the purpose of the present invention, the term "contrast" refers to a difference in brightness between light and dark areas of an image. Additionally, for example, the contrast of an image or pixel captured during a data read may be related to the original brightness of the recorded SLM image, and, for example, a negative contrast during a data read may refer to the image being inverted from the SLM image used during the write (e.g., pixels that were on during recordation are off during the read).

For the purpose of the present invention, the term "image contrast information" refers to information regarding a difference in brightness between light and dark areas of an image.

For the purposes of the present invention, the term "beam combiner" refers to a device capable of combining at least two beams of light. Exemplary, beam combiners may include, for example, beam splitters, such as, for example non-polarizing beam splitters (NPBS), pellicle beam splitters, etc.

For the purpose of the present invention, the term "camera" refers to a device capable of capturing an image. Exemplary cameras may include CMOS detector arrays and charged coupled devices (CCD).

For the purpose of the present invention, the term "processor" refers to a device capable of executing instructions and/or implementing logic. Exemplary processors may include application specific integrated circuits (ASIC), central processing units and microprocessors, such as, for example, microprocessors commercially available from Intel and AMD.

For the purpose of the present invention, the term "wave plate" refers to a device capable of altering the polarization state of a light wave traveling through it. Exemplary wave plates include quarter wave plates (QWP) and half wave plates (HWP).

For the purpose of the present invention, the term "local oscillator beam" refers to a light beam having a particular frequency and phase distribution. As used herein, the terms "local oscillator" and "local oscillator beam" may be used interchangeably. In exemplary embodiments described herein, a local oscillator beam may be coherently mixed or interfered with a reconstructed data beam.

For the purpose of the present invention, the term "local oscillator portion" refers to a portion of a light beam or an SLM used to modulate the local oscillator portion of a collinear beam used for homodyne and or heterodyne detection in a collinear holographic storage system. For example, a local oscillator portion of an SLM may be a central portion of the SLM. Similarly, a local oscillator portion of a light beam may be the portion of the light beam modulated by the local oscillator portion of an SLM.

For the purpose of the present invention, the term "reference pattern" refers to a pattern used by an SLM in a collinear holographic storage system for modulating a reference portion of a collinear beam.

For the purpose of the present invention, the term "reference pattern portion" refers to a portion of a light beam or an SLM used for generating a reference beam in a collinear holographic storage system. For example, a reference pattern portion of an SLM may be an exterior portion of the SLM. Further, the reference pattern portion may be used for forming a reference pattern. Similarly, a reference pattern portion of a light beam may be the portion of the light beam formed by the reference pattern portion of an SLM.

For the purpose of the present invention, the term "optical steering system" refers to one or more components configured to direct a light beam in a particular direction. Exemplary optical steering systems comprise systems configured to direct a combined beam towards a storage medium so that it passes into the storage medium to generate a reconstructed data beam. Exemplary components that may comprise an optical steering system comprise lenses, mirrors, galvo mirrors, etc.

For the purpose of the present invention, the term "homodyne detection" refers to detecting a reconstructed data beam wherein the reconstructed data beam is combined with a local oscillator beam in which the frequency of the local oscillator beam is substantially similar to the frequency of the reconstructed data beam.

For the purpose of the present invention, the term "heterodyne detection" refers to detecting a reconstructed data beam wherein the reconstructed data beam is combined with a local oscillator beam in which the frequency of the local oscillator beam is different than the frequency of the reconstructed data beam.

For the purpose of the present invention, the term "phase modulation pattern" refers to a two-dimensional distribution of the phase, $\theta$, of an optical beam, where as noted above the phase, $\theta$, refers to the angular coordinate of the optical field oscillation cycle.

For the purpose of the present invention, the term "polytopic aperture" refers to device comprising an aperture (e.g. a hole) positioned in the Fourier plane. For example, a polytopic aperture may be a hole in a sheet of metal positioned in the Fourier plane. During recording, a polytopic aperture may act as a low pass filter of the frequency components of the recording data beam. When reading data, a polytopic aperture may low-pass filter the reconstructed data beam, and filter out reconstructions of overlapping neighbor holograms. A further description of polytopic apertures may be found in Ken Anderson and Kevin Curtis, "Polytopic Multiplexing," Optics Letters, Vol. 29, No. 12, pp. 1402-1404 (Jun. 15, 2004), which is hereby incorporated by reference.

For the purpose of the present invention, the term "filtered intensity level" refers to an intensity level for an image. For example, a filtered intensity level may be an intensity level for a pixel of an image. Additionally, a filtered intensity level for a pixel may be determined, for example, by subtracting a mean level for all pixels of the image from the intensity level for the pixel. Or, for example, a filtered intensity level for a pixel of an image, may be determined by filtering an image (e.g., by a high pass filter to remove a slowly or non-varying local oscillator intensity prior to image capture or during processing).

DESCRIPTION

Embodiments of the invention may be used for recovering data in holographic memory systems, such as, for example, data storage and retrieval systems that implement holographic optical techniques such as holographic memory systems.

An embodiment of the system and method of the present invention may use homodyne detection to amplify and linearize a reconstructed hologram in the optical domain by adding a known, coherent optical signal (i.e., a local oscillator beam) to the reconstructed hologram. Amplifying and linearizing the reconstructed hologram may help to improve the signal to noise ratio (SNR) for the retrieved data.

Homodyne detection may be accomplished by mixing a page-sized local oscillator with the reconstructed data page signal which is not only optically phase-locked in time, but is everywhere phase-matched in space such that the local oscillator constructively interferences with each and every data pixel in the hologram simultaneously. This page-sized local oscillator may take the form of a plane wave illuminating the entire detector array. However, alignment tolerances, lens aberrations, wavelength and temperature sensitivities, and a host of other minute deviations from perfection may introduce small variations in the flatness of the "phase carrier" wavefront bearing the reconstructed data page. Thus, with prior systems, successfully performing page-wide homodyne detection in such a manner may require expensive, sophisticated adaptive optic elements and control algorithms in order to phase-match the local oscillator to the hologram (or vice-versa). As such, performing homodyne detection in such a manner may not be currently practical in a less expensive commercial system, and may only work with prior systems in a carefully controlled laboratory environment, if at all. As used herein the terms "local oscillator" and "local oscillator beam" will be used interchangeably.

In order to reduce the need for this specialized and expensive equipment, embodiments of the present invention may perform homodyne detection without the need for a precise local oscillator. For example, embodiments of the present invention may use two versions of an imprecise local oscillator that have a 90 degree phase difference between them (i.e., a quadrature relationship). Images of the hologram for each of these two local oscillator versions may then be captured and processed to obtain a high contrast image.

An embodiment of the present invention which performs homodyne detection using two versions of a local oscillator is shown in FIG. 1 which illustrates a simplified diagram of a holographic memory system 100 in accordance with embodiments of the invention. For purposes of simplification, only the components of the holographic memory system 100 in the light path between the storage medium 102 and the camera 120 are illustrated. In actual implementation, the holographic memory system 100 may include numerous other components, such as, for example, additional light sources, mirrors, additional beam splitters, etc. For example, holographic memory system 100 may be employed in a holographic memory system such as disclosed in U.S. patent application Ser. No. 11/440,370 entitled "Illuminative Treatment of Holographic Media" filed May 25, 2006, which is hereby incorporated by reference in its entirety.

As illustrated in FIG. 1, holographic memory system 100 may include a holographic storage medium 102, an objective lens 104, a half-wave plate (HWP) 106, a non-polarizing beam splitter (NPBS) 108, another lens 110, a polytopic aperture 112, another lens 114, a polarizing beam splitter (PBS) 116, a spatial light modulator (SLM) 118, a camera 120, and a phase retarder 122. Additionally, holographic memory system 100 of FIG. 1 may further include a light source 150, an adjustable HWP 152, a second PBS 154, a mirror 156, a HWP 157, a galvo mirror 158, and a processor 180. The processor 180 may be a processor, such as, for example a commercially available microprocessor, and the phase retarder 122 may be device capable of phase shifting a light beam, such as, for example, a switchable quarter wave plate (QWP). Additionally, the combination of lens 110, polytopic aperture 112, and lens 114 may be referred to as a "4F relay."

Holographically-stored data may retrieved from the holographic storage medium 102 by performing a read (or reconstruction) of the stored data. The read operation may be performed by projecting a reference beam 132 (also referred to as a probe beam) onto or into the storage medium 102 at the same angle, wavelength, phase, position, etc., as the reference beam used to record the data, or compensated equivalents thereof. The hologram and the reference beam interact to reconstruct the data beam. As is known to those of skill in the art, the reconstructed data beam 134 may comprise the reconstructed data on a phase carrier. The reconstructed data beam 134 may then pass through lens 104 and HWP 106. Objective lens 104 may be, for example, any type of lens, such as those commercially available. Exemplary lenses include, for example, a high numerical aperture (N.A.) aspheric storage lenses. Lens 104 may also be located one focal length (i.e., the focal length of lens 104) from holographic storage medium 102 and may be capable of expanding reconstructed data beam 134. It should be noted that these lenses and their locations are exemplary and that in other embodiments, for example, the lenses may have different locations. For example, in an embodiment it may be desirable for the storage medium 102 to be slightly out of focus.

The reconstructed data beam 134 may then be combined with a local oscillator beam 136 by NPBS 108. Local oscillator beam 136 may be, for example, a plane wave. Further, local oscillator beam 136 may be generated from a portion of the reference beam 132, so that local oscillator beam 136 is temporally coherent with the reconstructed data beam. The local oscillator beam 136 is injected or introduced into the reconstructed object path (i.e., is combined with the reconstructed data beam 134) so that it is collinear with and has the same polarization state as the reconstructed data beam 134, although the local oscillator beam 136 need not have any special phase relationship to reconstructed data beam 134. The power of the reflected local oscillator beam 136 may be set to some power level to effect or cause the desired amount of optical gain and dynamic signal range (e.g., 100 times the nominal power of the reconstructed data beam). This may be accomplished by, for example, splitting off a portion of the main laser used for generating the reference beam 132 by, for example, inserting a HWP 152 in the path of the main laser beam and adjusting an angle of the HWP 152 to control the power of the generated local oscillator beam 136.

FIG. 1 includes a simplified illustration of a mechanism for generating local oscillator beam 136 and reference beam 132, in accordance with embodiments of the invention. As illustrated in FIG. 1, this mechanism may include a light source 150, an adjustable HWP 152, a PBS 154, mirror 156, and galvo mirror 158. It should be noted that this is a simplified diagram provided for illustrative purposes and that in actual implementation additional or alternative components may be used. For example, in other embodiments, another 4F relay or another galvo mirror in tandem with galvo mirror 158 may be used to keep the reference beam from walking as the angle changes during reading or writing data.

Light source 150 may be, for example, a laser such as is commonly used in holographic memory systems. The angle of HWP 152 may be adjusted to modify the polarization of main beam 160 such that PBS 154 splits of a portion of main beam 156 for local oscillator beam 136. The remaining portion of main beam 160 passes through PBS 154 and may be directed by mirror 156 and galvo mirror 158 to form reference beam 134. By setting the angle of HWP 152 the power of local oscillator beam 136 may be controlled. It should be noted that this simplified diagram of the holographic memory system 100 of FIG. 1 is for illustrative purposes only, and that holographic memory system 100 may include numerous other components, such as additional mirrors, etc. It should also be noted that FIG. 1 illustrates one example for generating reference beam 132 and local oscillator beam 136, and that other implementations may be used, such as, for example, using two separate phase-locked lasers, the geometry and components of holographic memory system 100 may be different without departing from the invention.

Local oscillator beam 136 may pass through phase retarder 122 prior to being injected or introduced into the signal path where local oscillator beam 136 may be combined with reconstructed data beam 134. Phase retarder 122 may be any type of device capable of changing the phase of local oscillator beam 136, such as, for example, a commercially available Ferroelectric Liquid Crystal (FLC) QWP. For example, a QWP (phase retarder 122) may be configured to switch between two states where in one state the fast axis of QWP may be aligned to the polarization of local oscillator beam 136 in order to impart one phase delay, but in the other state the slow axis of the may be aligned with the linear polarization of the local oscillator beam 136, corresponding to an absolute phase difference of 90 degrees. That is, phase retarder 122 may be capable of being switched so that phase retarder 122 may change the phase of the local oscillator beam 136 by 90 degrees.

NPBS 108 combines the local oscillator beam 136 and reconstructed data beam 134 to produce combined beam 138. NPBS 108 may include a partially reflective coating such that allows 95% of light to pass through the NPBS 108 and 5% of light to be reflected. In such an example, 95% of reconstructed data beam 134 will pass through NPBS 108 and 5% will be reflected away. Similarly, 95% of local oscillator beam 136 will pass through NPBS 108 while 5% of local oscillator beam 136 is reflected and combined with reconstructed data beam 134. Thus, in this example, combined beam 138 comprises 95% of the reconstructed data beam 134 and 5% of the local oscillator beam 136. Further, in this example, the portions of the local oscillator beam 134 (i.e., the portion passing through NPBS 108) and reconstructed data beam 136 (i.e., the portion reflected by NPBS 108) not used for generating combined beam 138 may be passed to a device, such as, for example, a beam block for absorbing these unused portions of beams 134 and 136.

The combined beam 138 may then pass through lens 110 which focuses the combined beam 138. Lens 110 may be located, for example, so that its front focal plane is the back focal plane of lens 104. The focused combined beam 138 may then pass through polytopic aperture 112 which may be located, for example, 1 focal length from lens 110. Polytopic aperture 112 may be used to filter noise from combined beam 138. Combined beam 138 may then pass through lens 114, which may be located, for example, 1 focal length from polytopic aperture 114. Lens 114 may expand combined beam 138 so that beam 138 has a fixed diameter. Combined beam 138 may then enter PBS 116 which, because of the polarization of combined beam 138, directs combined beam 138 towards camera 120 which detects the received image. Camera 120 may be any type of camera capable of detecting combined beam 138, such as, for example, a CMOS detector array or charged coupled device (CCD). Although in the embodiment, FIG. 1 shows use of NPBS 108 for combining local oscillator beam 136 with reconstructed data beam 134, in other embodiments, other devices may be used, such as, for example, a pellicle beam splitter or a plate beam splitter.

If the local oscillator beam 136 and the reconstructed data beam 134 have the same phase, they will constructively interference. For example, FIG. 2 illustrates exemplary signals where the local oscillator beam 136 is coherent and phase-locked in time, and phase matched in space with the reconstruction data beam 138. SLM pattern signal 202 corresponds to a portion of one row of the SLM pattern used when the hologram is recorded, where the x-axis is spatial coordinate and the y-axis indicates the optical filed (or electrical field) for SLM pattern signal 202 and electric field strength ($E_S$) curve 204 and the y-axis indicates the intensity (or irradiance) for the intensity (I) curve 206. In the illustrated plots, the distance is normalized to SLM pixels.

In the embodiment described in FIG. 1, holographic memory system 100 may store information using a technique referred to as phase shift keying (PSK) where data may be stored as either "+1" or "−1." SLM 118 in FIG. 1 may be capable of modulating the phase of the light used for recording the hologram pixel by pixel. In the embodiment shown in FIG. 1, a "+1" may be represented by a particular a pixel of SLM 118 modulating the data beam used in recording the hologram so that the data beam at that particular pixel location has a particular phase (e.g., 0 degrees). A "−1" may be represented by a pixel of SLM 118 modulating the recording data beam so that the data beam is 180 degrees out of phase with the "+1" pixels. In other words, there is a 180 degree phase difference between the +1 and −1 pixels. While this technique is exemplified as using only two phases (referred to as Binary PSK (BPSK), in other embodiments, other PSK techniques may be used, such as, for example, quaternary PSK (QPSK), i.e., using four phases.

Alternatively, other embodiments may use a technique referred to as amplitude shift keying (ASK), which uses 1's and 0's in recording the data. Pursuant to this technique, a "1" may be represented by turning a particular a pixel of SLM 118 on, while a "0" may be represented by a particular pixel being off.

In FIG. 2, BPSK SLM pattern signal 202 is shown as having sharp edges and straight lines, with SLM signal pattern signal 202 having an amplitude of +1 at locations where the SLM pixel is one (e.g., between locations −3 and −2, −1 and 0, and +1 and +2, and +2 and +3). Conversely, BPSK SLM signal pattern 202 has a "−1" amplitude value at locations where the corresponding SLM pixel is zero.

FIG. 2 further illustrates the electric field strength ($E_S$) 204 for the recovered hologram after being combined with local oscillator beam 136 when the hologram is reconstructed. As shown, $E_S$ 204 has rounded edges due in part to low pass filtering by the polytopic aperture 114 during reading and writing of the hologram. Additionally, $E_S$ 204 exhibits, in this example, a constant +2 offset due to the local oscillator beam 136. FIG. 2 also illustrates the intensity (I) 206 for the combined signal 138 (i.e., the reconstructed data beam 134 combined with the local oscillator beam 136) where the local oscillator beam 136 is both phase locked in time, and phase matched in space, with the reconstructed data beam 134, such that the two beams 136 and 134 constructively interfere with each and every data pixel in the recovered hologram simultaneously. This intensity (I) 206 may be calculated as $I=|E_S+E_{LO}|^2$, where $E_{LO}$ is the electric field strength local oscillator beam 136. As illustrated by the intensity (I) 206 of the combined beam 138, the local oscillator beam 136 effects or causes a constant multiple gain to reconstructed data beam 136. In addition to this constant multiple gain, the local oscillator beam 136 also introduces an offset (+2 in this example). A further description of the mathematics describing these effects is provided below.

FIG. 3 illustrates a similar diagram to that of FIG. 2, but where the local oscillator beam 136 and reconstructed data beam 134 are 180 degrees out of phase in time. This results in destructive interference and inversion of the detected intensity I. For example, as shown in FIG. 3, the SLM signal pattern 302 is identical and the electric field strength $E_S$ 304 is identical (but shifted down) relative to that in FIG. 2 due to the local oscillator beam 136 being 180 degrees out of phase with the reconstructed data beam 138. The intensity (I) 306 is substantially inverted compared to that of the reconstructed data beam 134. For example, as shown in FIG. 3, the intensity (I) 306 is at a maximum when $E_S$ 304 is at a minimum, and conversely the intensity (I) 306 is at a minimum when $E_S$ 304 is at a maximum.

FIG. 4 illustrates a similar diagram to that of FIG. 2, but with the local oscillator beam 136 and reconstructed data beam 134 90 degrees out of phase in time. This results in low contrast of the detected intensity (I) 406 of the combined beam 138. For example, as shown in FIG. 4, the SLM signal pattern 402 is identical and the electric field strength, $E_S$ 404, for the recovered hologram is identical (but shifted down) relative to that shown in FIG. 2. However, due to the local oscillator beam 136 being 90 degrees out of phase with the reconstructed data beam 138, the intensity (I) 406 of the combined signal 138 does not exhibit a gain, but instead the difference between the maximum and minimum of the intensity (I) 406 of the combined signal 138 is reduced. This may result in blurring of the signal.

Returning to FIG. 2, alignment tolerances, lens aberrations, wavelength and temperature sensitivities, and a host of other minute deviations from perfection may introduce small variations in the flatness of the "carrier" wavefront for the reconstructed data beam 134. Thus, there may be a phase difference between the reconstructed data beam 134 (i.e., the hologram) and the local oscillator beam 136. This phase difference may result in the image detected at camera 120 containing fringes. The fringes may delineate regions where the interference between the reconstructed data beam 134 and the local oscillator beam 136 is constructive, destructive, and/or in-between. The constructive interference regions may appear with high contrast; the destructive interference regions may also appear with high contrast, but may be inverted; and the in-between regions may appear with low contrast (i.e., will be blurred).

Figure 5:
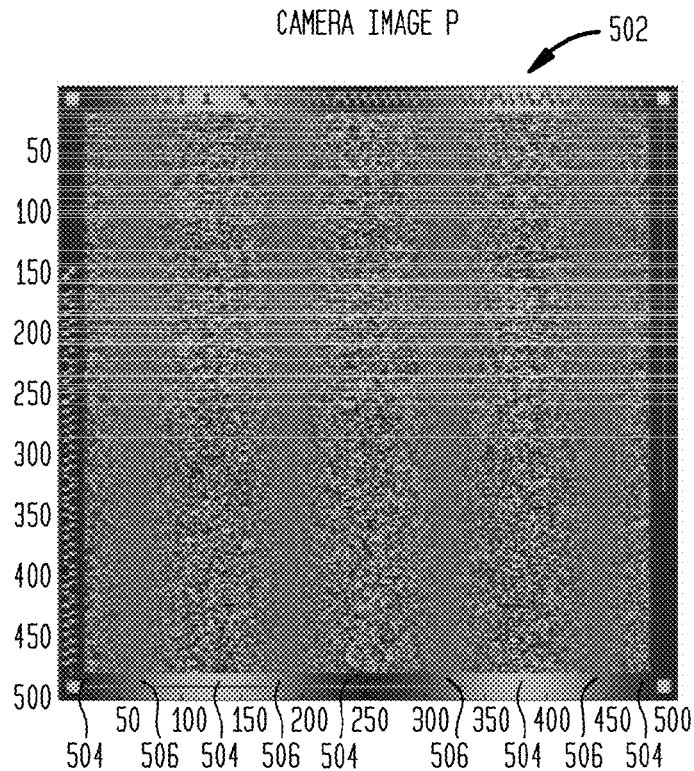
FIG. 5 illustrates an exemplary P image of a detected hologram, in accordance with embodiments of the invention.

FIG. 5 illustrates an exemplary image of a hologram detected at camera 120. This camera image will be referred to hereafter as the "P" image 502. The designation of this image as a P image is an arbitrary designation for explanatory purposes. As illustrated, P image 502 includes fringes resulting from the phase difference between local oscillator beam 136 and reconstruction data beam 138. As particularly shown in FIG. 5, constructive and deconstructive interference regions 504 are visible as high contrast regions (e.g., the brighter vertical columns located at approximately X=0, 125, 250, 375, and 500). The low contrast regions 506 are visible in FIG. 5 as dark vertical columns (e.g., at approximately X=75, 175, 325, and 425). (It should be noted that this image in FIG. 5 is only exemplary and is presented solely for illustrative purposes.)

After capturing the P image, the phase retarder 122 may be switched to cause a 90 degree phase shift in the local oscillator beam 136. The resulting image, referred to herein for explanatory purposes as the "Q" image, may then be captured by camera 120. Since the phase of the local oscillator beam 136 has changed by 90 degrees, the fringe pattern in the detected hologram will also shift by 90 degrees. In particular, the regions that were previously high contrast (the constructive and destructive interference regions) will become low contrast; while the previously low contrast in-between regions will become high contrast (constructive or destructive).

Figure 6:
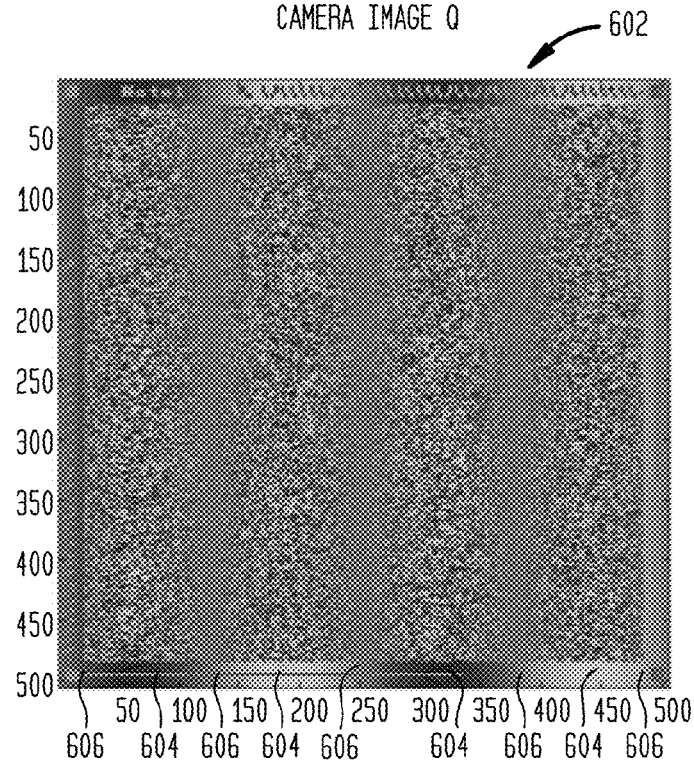
FIG. 6 illustrates an exemplary Q image of a detected hologram, in accordance with embodiments of the invention.

FIG. 6 illustrates an exemplary Q image 602 detected at camera 120. Like P image 502, Q image 602 includes fringes resulting from the phase difference between local oscillator beam 136 and reconstruction data beam 138. As particularly shown in FIG. 6, constructive and deconstructive interference regions 604 are visible as high contrast regions (i.e., the brighter vertical columns located at approximately X=75, 175, 325, and 425). Conversely, the low contrast regions 606 are visible as dark vertical columns (i.e., at approximately X=0, 125, 250, 375, and 500). Like FIG. 5, it should be noted that this image in FIG. 6 is only exemplary and is presented solely for illustrative purposes.

The two quadrature images (i.e., the P and Q images) of FIGS. 5-6 may then be processed with a digital algorithm executed by a processor 180. In an embodiment, the images include control information consisting of "reserved block" patterns distributed throughout them. A further description of methods for processing data pixels and reserved blocks according to embodiments of the system and method of the present invention is disclosed in U.S. application Ser. No. 10/879,847, "Method and System for Equalizing Holographic Data Pages," filed on Jun. 28, 2004, and in the respective continuation-in-part, U.S. application Ser. No. 11/069, 007, "Processing Data Pixels in a Holographic Data Storage System," filed Feb. 28, 2005, and in Mark Ayres, Alan Hoskins, and Kevin Curtis, "Image oversampling for page-oriented optical data storage," Applied Optics, Vol. 45, No. 11, pp. 2459-2464 (Apr. 10, 2006) all of which are hereby incorporated by reference in their entirety.

For example, SLM 118 may be configured (e.g., directed by a processor 180) to use a page recording format including reserved blocks, which are small regions of known pixel patterns that are distributed throughout the data page to be recorded. The reserved blocks contain data-like pseudo-random bit patterns. In the embodiments of FIGS. 5-6, the reserved blocks will described for exemplary purposes as being 8×8 pixel blocks distributed on a grid at a spacing of 64 pixels in both the x and y directions SLM page recording format.

By performing pattern recognition operations (e.g. cross-correlations), the algorithm executed by the processor 180 may be able to determine the contrast level and inversion state of each reserved block image within the two holographic images (e.g., the P and Q images). The reserved block correlation signal for each image may then be interpolated to the regions between the reserved blocks, serving as an estimate of the phase difference between the local oscillator beam 136 and the phase carrier for the reconstructed data beam 134. With this information, the algorithm may be able to combine the two quadrature images into a single high-contrast image that approximates the image that would have appeared had a local oscillator beam 136 been phase-aligned everywhere in a single exposure. The algorithm combines the constructive interference regions of the P and Q images with inverted versions of the destructive interference regions (thereby restoring polarity). Because of the quadrature relationship between the two images, every pixel appears somewhere in a high contrast region, or in two medium contrast regions that may be combined into an estimate of equivalent quality. A more detailed description of this exemplary algorithm will be provided below with reference to FIG. 7.

Figure 7:
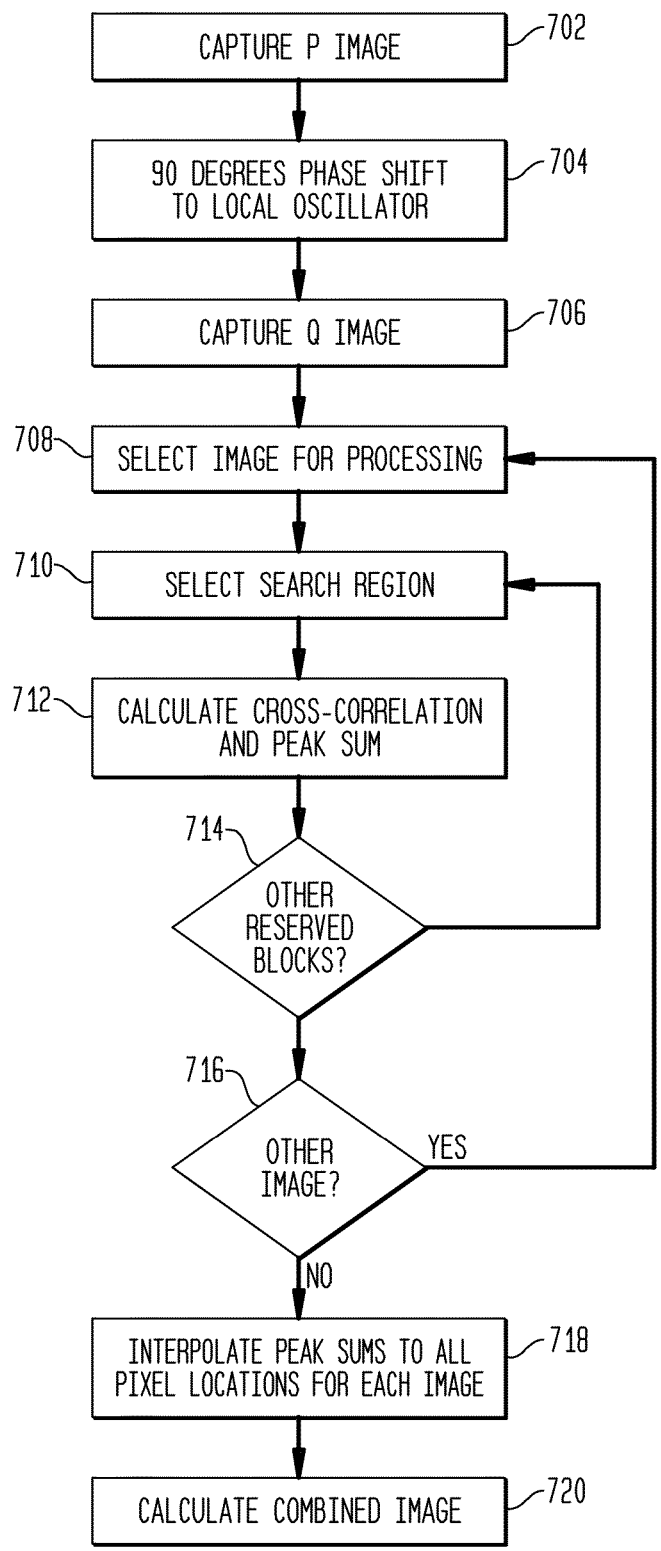
FIG. 7 provides an exemplary flow chart of a method for generating an estimate of a combined image, in accordance with embodiments of the invention.

FIG. 7 provides an exemplary flow chart of a method for generating an estimate of combined image that might have resulted had the local oscillator beam 136 been phase matched with reconstructed data beam 134. FIG. 7 will also be discussed with reference to the above-discussed FIG. 1. First, the P image may be captured by camera 122 and provided to the processor 180 (step 702). Further, although this method will be described as being executed by a single processor, in other embodiments processor 180 may comprise multiple separate or interconnected processors without departing from the present invention. After the P image is captured, the processor (not shown) may direct phase retarder 122 to effect or cause a 90 degree phase shift in the local oscillator beam 136 (step 704). The Q image may then captured by camera 122 and provided to the processor (not shown) (step 706). After both images are provided to the processor, one of the images may be selected for processing (step 708). Although the images are shown in FIG. 7 as being sequentially processed, it should be understood that, in other embodiments of this method, the P and Q images may be, for example, processed in parallel. In addition, for the flow diagram of the embodiment shown in FIG. 7, the P image will be processed first.

A region of the image may then select where it is expected that a reserved block would be located (step 710). This region, for exemplary purposes, may be a 20×20 pixel region of the image. As noted above, each reserved block may be an 8×8 pixel block having a predetermined pattern. This reserved block may, for example, comprise an inner 6×6 pattern and the 28 pixels surrounding this 6×6 inner pattern may selected such that covariance of the 6×6 pattern with any of the 8 edge-bordering pixels is zero. In other words, the inner 6×6 sub-block has half of its pixel states in common with its eight neighboring sub-blocks, with the other half of its pixel states being different from neighboring sub-blocks. In this circumstance, the contribution of cross-correlation noise to the covariance values neighboring the peak goes to zero. Reserved blocks are further described in the above-incorporated U.S. patent application Ser. No. 11/069,007.

The cross-correlation of the expected pattern may be calculated for this region (e.g., the 20×20 region of the image, such as Q image 502 and P image 602, where it is expected to find this reserved block pattern) (step 712). An embodiment may be practiced with oversampling, such as described in the above-incorporated by reference U.S. patent application Ser. No. 11/069,007. When practiced with oversampling, the camera pixels are smaller that the SLM pixels. Thus, the binary 6×6 pattern may become a multi-level 8×8 pattern on the camera. Additionally, in an embodiment the mean (D.C.) component (i.e., the offset) of this expected pattern may be removed so that the cross-correlation with a random camera block will tend towards zero rather than the product of the means. Accordingly, in such an example the expected pattern may be an 8×8 pattern representing the 6×6 inner pattern used in recording the hologram as it would appear on the camera pixels (which may be smaller than the SLM pixels), minus the average component. Thus, this expected pattern (e.g., the 8×8 pattern) may be referred to as an oversampled D.C.-free version of the known pixel pattern (e.g., the 6×6 pattern) of the reserved block expected to be located in the region.

These cross-correlations may be determined by calculating the correlation for the 8×8 expected pattern at one location in the region (e.g. the 20×20 region) by, for example, summing the combined values of the expected pattern (e.g., the 8×8 pattern) with the values of the corresponding pixel in the region. Then, the expected pattern may be shifted by one pixel in the region and the combined values of the expected pattern and region's pixels summed, and so on, until the correlation value for every possible location in the region for the expected pattern is calculated. For example, with a 8×8 expected pattern and a 20×20 region, this will result in 13×13 or 169 separate correlation values being calculated for the region.

This calculated cross-correlation will have a peak value (either positive or negative) that may be located at the location of the reserved block if the reserved block is located in a high contrast region. The intensity and location of this peak may be stored by the processor. That is, in selecting the pixel location with the peak value, this exemplary algorithm uses the absolute value of the cross-correlation and selects the pixel location with the largest absolute value of the cross-correlation.

Because it is possible that the location of the reserved block might not fall directly on a particular pixel, a peak sum may also be used for the cross-correlation. For example, due to various alignment errors, the reserved block might be shifted by a fraction of a pixel at camera 120. To help compensate for this, a peak sum for the cross-correlation may be calculated by summing the cross-correlation values for the pixel location where the maximum absolute value of the cross-correlation is found along with a number of pixel locations surrounding this pixel location. For example, the peak sum may be calculated by summing together the cross-correlations for a neighborhood of 2×2 pixel locations including the pixel location with the cross-correlation having the maximum absolute value. Or, in other examples, the 2×3, 3×2 or 3×3 pixels surrounding the pixel location with the largest absolute value may be used in calculating the peak sum.

After determining the cross-correlation in step 712, the next step is to determine whether there are other reserved blocks for which a cross-correlation value should be determined (step 714). For exemplary purposes, there are 11×12 equally spaced reserved patterns located in the SLM page format of FIGS. 5 and 6. If there are more reserved blocks for which there may be a need to calculate the cross-correlation, the method may be repeated by returning, as shown in FIG. 7, to step 710 with the cross-correlation for the next reserved block being calculated (steps 712). In the next step, it may be determined whether the cross-correlation values for the other image are to be calculated (step 716). If so, the method may again be repeated by returning, as shown in FIG. 7, to step 708 with the cross-correlations being determined for each reserved block of this image (e.g., the Q image) being calculated (steps 710-714).

These calculated cross-correlations values may be used to generate peak sum maps for the Q and P images that indicate the maximum calculated cross-correlation peak sum value for each of the reserved blocks for each respective figure. These peak sum maps will have maximum intensity values (i.e., values approaching the absolute value of the product of the norm of the 8×8 expected pattern and the norm of the 8×8 camera pattern at that location) for reserved block located in high contrast regions and minimum intensity values (i.e., values near 0) for reserved blocks located in low contrast regions. These peak sum maps may serve as measurements of the relative phase difference between the local oscillator beam 136 and the reconstructed data beam 134.

Figure 8:
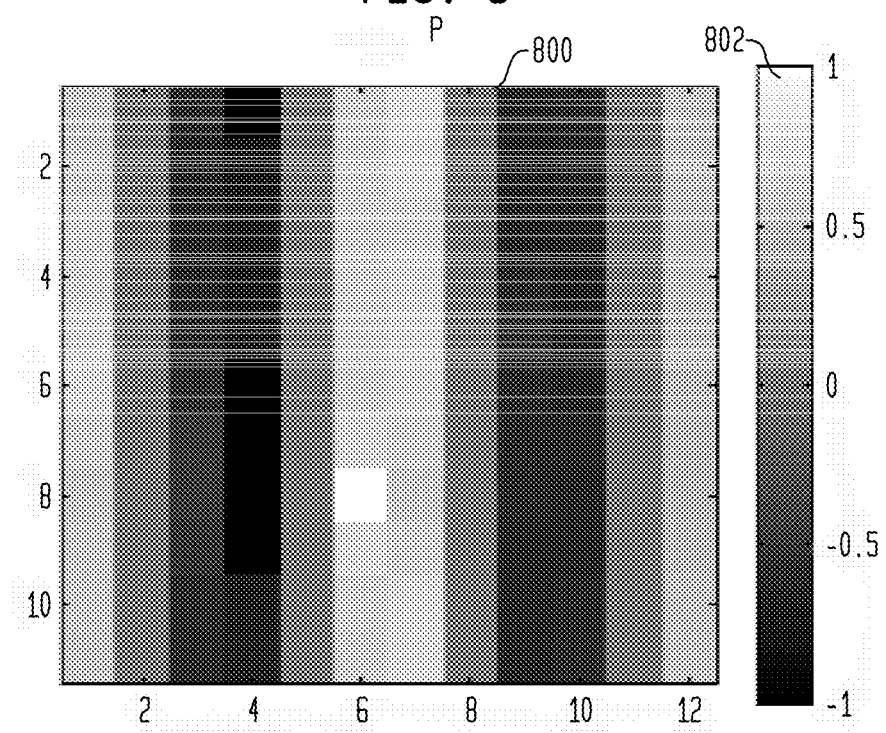
FIG. 8 illustrates an exemplary peak sum map of a P image, in accordance with embodiments of the invention.
Figure 9:
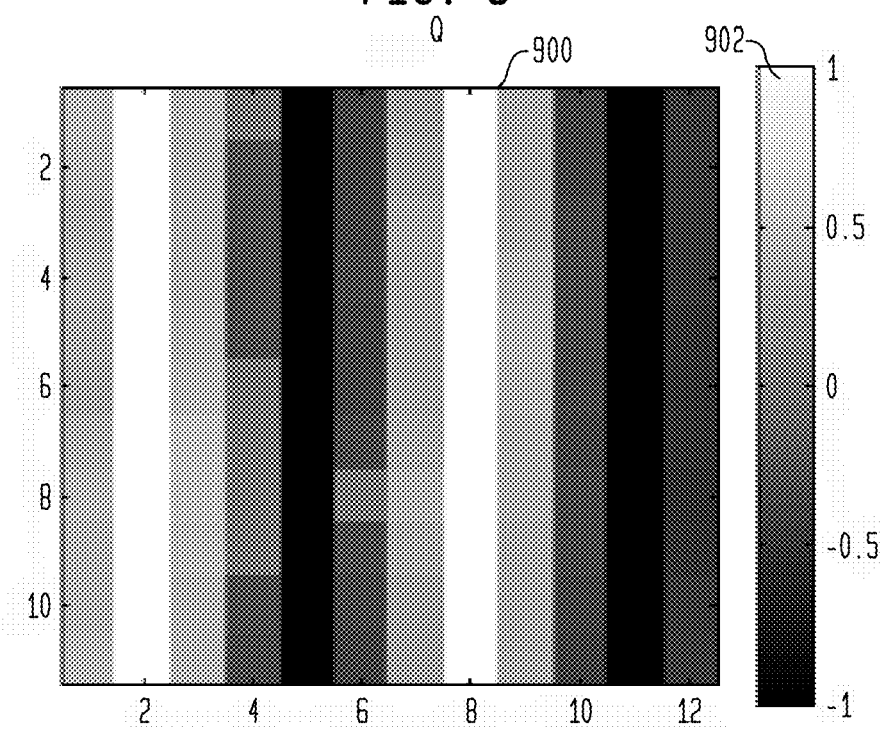
FIG. 9 illustrates an exemplary peak sum map of a Q image, in accordance with embodiments of the invention.

FIG. 8 illustrates an exemplary peak sum map 800 of the calculated peak intensity value 802 for each of the 11×12 reserved blocks of the SLM page format for the P image illustrated in FIG. 5. As shown in FIG. 8, the calculated peak intensity values have maximum intensity values (i.e., values approaching plus or minus the maximum value) at locations corresponding to the high contrast regions 504 of the P image illustrated in FIG. 5. FIG. 9 illustrates a similar exemplary peak sum map 900 of the calculated peak intensity value 902 for each of the 11×12 reserved blocks of the SLM page format for the Q image illustrated in FIG. 6. As shown in FIG. 9, the calculated peak intensity values have maximum intensity values (i.e., values approaching plus or minus the maximum value) at locations corresponding to the high contrast regions 604 of the P image illustrated in FIG. 5.

Returning to the flow chart of FIG. 7, after the peak sums for the reserved blocks of each image are calculated (step 712), the peak sum values may be interpolated for each image (i.e., the Q and P images) to all pixel locations for the respective image (step 718). This interpolation may be accomplished, for example, by performing a simple linear two-dimensional (2D) interpolation. In the next step, the combined image may be calculated (step 720). This combined image may be calculated by multiplying the interpolated peak sum value for each pixel and the image value for each pixel of a respective image and then adding it to the value of each pixel for the other image multiplied by the interpolated peak sum value for that pixel. That is, the intensity for each pixel of the combined image may be calculated using the following formula:

Combined Pixel Intensity=[(P image pixel intensity)*(interpolated peak sum for P image pixel)]+[(Q image pixel intensity)*(interpolated peak sum for Q image pixel)]

In an alternative embodiment, the combined image may be calculated by multiplying each pixel of the respective image by a scaling factor determined by a formula involving both interpolated peak sum values for that pixel. For example, the combined pixel intensity may be determined in a manner that normalizes the expected intensity and minimizes the expected noise according to the formula $$I_{comb} = I_P \frac{P}{|P|^2 + |Q|^2} + I_Q \frac{Q}{|P|^2 + |Q|^2}$$

where $I_{comb}$ is the combined pixel intensity, $I_P$ is the P image pixel intensity, $I_Q$ is the Q image pixel intensity, P is the interpolated peak sum for the P image, and Q is the interpolated peak sum for the Q image.

In an alternative enhancement to this procedure, the interpolated peak sum values for a given pixel may be compared to see if the absolute value of one dominates. For example, if |P|>v|Q| where v is a threshold value for example equal to three, then the interpolated peak sum value of Q for that pixel may be replaced by zero so that the P image pixel value will entirely determine the combined pixel intensity value. Similarly, if |Q|>v|P| the interpolated peak sum value of P for that pixel may be replaced by zero. This enhancement may reduce the risk of selecting a false peak due to small interpolated peak sum values corresponding to low contrast regions where the true cross correlation peak is weak.

In yet another enhancement to this procedure, an estimate of the local oscillator intensity may be subtracted from the P and Q pixel intensities prior to use in determining the combined pixel intensity. This may be accomplished by subtracting the average value of all the P pixel intensities from each pixel of the P image, and likewise subtracting the average value of all the Q pixel intensities from each pixel of the Q image thereby producing a filtered intensity level for each pixel in the P image, and a filtered intensity level for each pixel in the Q image. Alternatively, the averaging could be done over smaller sub-blocks, e.g., 32×32 pixels; or the P and Q images could be filtered with a high-pass filter to remove the slowly-varying (and ideally non-varying) local oscillator intensity.

Figure 10:
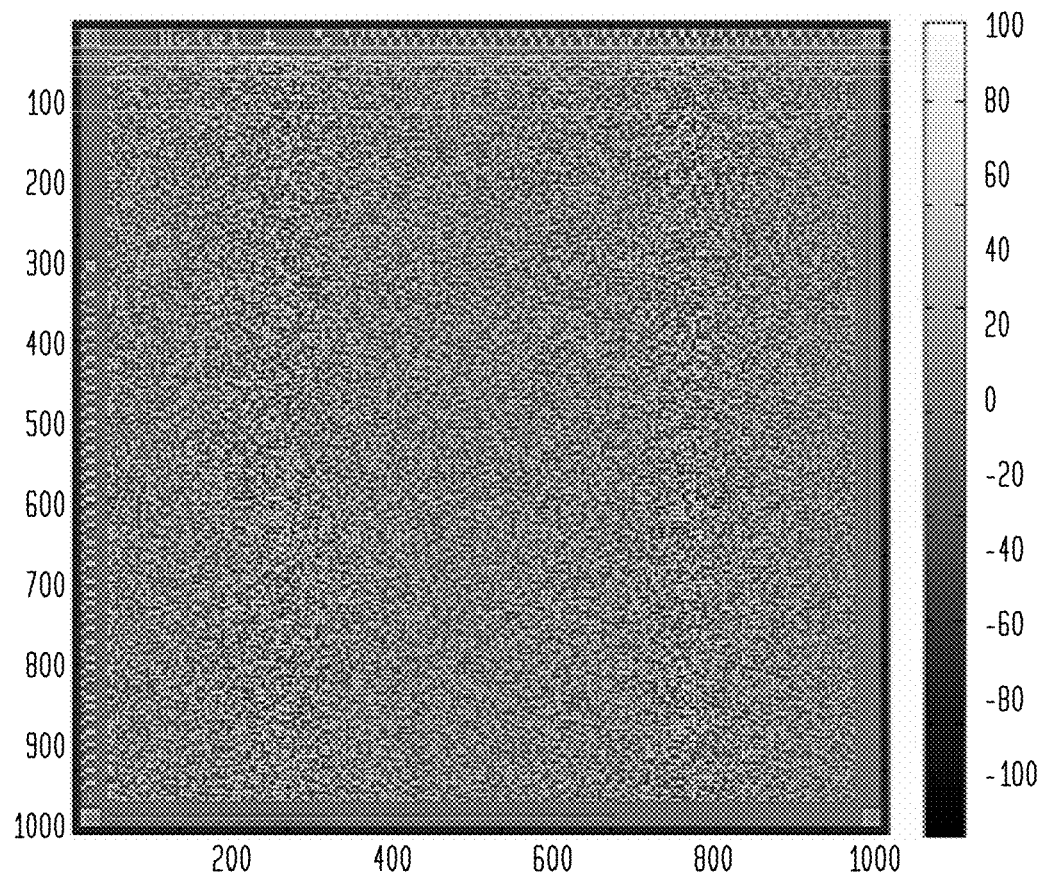
FIG. 10 illustrates an exemplary combined image formed from the images of FIGS. 5 and 6, in accordance with embodiments of the invention.

The combined image represents the image that would have been detected with a single, phase matched local oscillator. FIG. 10 illustrates an exemplary combined image of the images of FIGS. 5 and 6. As shown in FIG. 10, the high contrast regions have been combined so that the entire combined image is a high contrast image. This combined image may then be further processed using conventional detection methods. In addition, information from the P and Q reserved block correlation operations may be incorporated into this processing. For example, the correlations calculated for the P and Q images may be used in calculating the correlations rather than recalculating the correlations using methods disclosed in the above-incorporated by reference U.S. application Ser. No. 10/879,847 and U.S. application Ser. No. 11/069,007.

The presently described embodiment (e.g., system 100, as well as systems 1100, 1200, 1300, 1400, and 1600 to be described hereafter) may provide the ability to detect the sign of the optical field (as well as the magnitude), which permits the data to be encoded with phase shift keying (PSK) rather than the typically used amplitude shift keying (ASK). PSK, however, may not often be used for holographic storage since a conventional photodetector may not detect the difference between the two phases. However, all other factors being equal, the use of PSK modulation may produce an immediate improvement of 3 dB in signal to noise ratio when compared to ASK. Furthermore, using PSK for data encoding provides additional benefits for holographic storage. In particular, the "D.C. hot spot" that may appear at the center of the Fourier plane of an ASK-modulated data page may be eliminated (i.e., no phase mask may be required for Fourier plane recording), and the contribution of certain holographic noise terms (e.g., intraobject gratings that are written between individual pairs of pixels in the object beam) may be greatly reduced. The general improvement in uniformity of the object beam may also enhance the capability of the holographic storage medium to record holograms without local sensitivity depletion, or effects from uneven shrinkage and uneven bulk index changes.

An additional benefit of homodyne detection according to embodiments of the present invention is that the optical gain introduced by the homodyne detection makes the total exposure time for the two quadrature images potentially far less than the exposure time required for a single non-homodyne image. Additionally, in order to minimize the number of fringes in the P and Q images, embodiments of the present invention may include components for ensuring that the holographic storage medium 102 maintains an accurate position. For example, the holographic memory system may include components for moving the holographic storage medium in x, y, and z directions (i.e., back and forth, up and down, and right to left). Embodiments of the system of the present invention may further include processing for determining errors in the positioning of the holographic storage medium 102 by determining the x component, y component, and quadratic component of the fringe pattern, and adjusting the storage medium's 102 position accordingly. For example, in the complex wavefront of the difference between the reconstructed data beam phase carrier and the local oscillator as measured by the P and Q interpolated peak sum images and having the form $\exp(i*\arctan 2(Q, P))$; the x positioning error will be manifested as a factor of the form $\exp(i*f_x*x)$, the y positioning error will be manifested as a factor of the form $\exp(i*f_y*y)$, and the z positioning error will be manifested as a factor of the form $\exp(i*f_z*(x^2+y^2)/2)$, where $f_x$ is a constant proportional to the x positioning error, $f_y$ is a constant proportional to the y positioning error, and $f_z$ is a constant proportional to the z positioning error.

Figure 11:
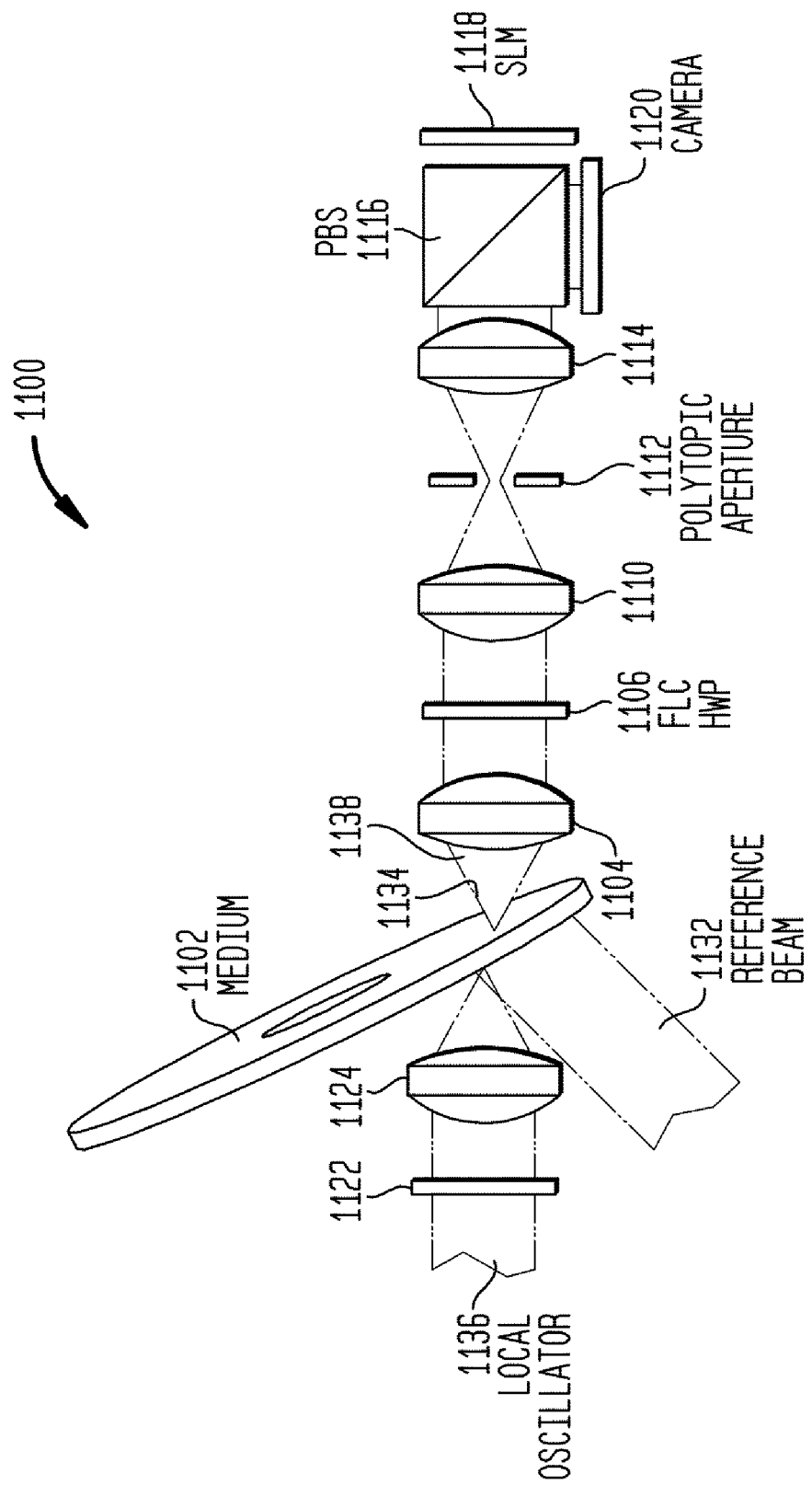
FIG. 11 illustrates an alternate embodiment to the system of FIG. 1 showing an alternate way for introducing a converging local oscillator beam that passes through the hologram, in accordance with embodiments of the invention.

FIG. 11 illustrates an alternate embodiment of the system of FIG. 1 where the local oscillator beam may be introduced as a converging beam that passes through the hologram. As shown in FIG. 11, holographic memory system 1100 may include a holographic storage medium 1102, a lens 1104, a half-wave plate (HWP) 1106, another lens 1110, a polytopic aperture 1112, another lens 1114, a polarizing beam splitter (PBS) 1116, a spatial light modulator (SLM) 1118, a camera 1120, a phase retarder 1122, and another lens 1124. These components may be the same or similar to those discussed above with reference to system 100 of FIG. 1. (For simplification, only the components of the holographic memory system 1100 in the light path between the storage medium 1102 and the camera 1120 are illustrated in FIG. 11.) Further, holographic memory system 1100 may function identically or similarly to that of the system of FIG. 1 with, for example, the exception that the local oscillator beam 1136 may be combined with the reconstructed data beam 1134 contact within the holographic storage medium 1102. System 1100 may have the advantage of not incurring a power loss for the reconstructed data beam 1134 or the local oscillator beam 1136, but may also introduce undesirable aberrations or scattering of the local oscillator beam 1136. Further, as with the embodiment of FIG. 1, phase retarder 1122 may be a QWP, such as, for example, a switchable FLC QWP.

In the holographic memory system 1100 of FIG. 11, local oscillator beam 1136 passes through phase retarder 1122 (e.g., a QWP) where its phase may be shifted by 90 degrees such as in system 100 of FIG. 1. Local oscillator beam 1136 then passes through lens 1124 which may be located so that its back focal plane is coincident with the front focal plane of lens 1104. Lens 1124 may focus local oscillator beam 1136 so that it passes through the same location of holographic medium 1102 that reference beam 1132 passes through. Local oscillator beam 1136 may then combine with the reconstructed data beam 1134 generated by reference beam 1132 passing through holographic storage medium 1102. The combined beam 1138 then passes through lens 1104, HWP 1106, lens 1110, polytopic aperture 1112 and lens 1114, all of which may function the same or similar to the corresponding components of system 100 of FIG. 1. PBS 1116 may then reflect combined beam 1138 towards camera 1120, which captures an image of combined beam 1138. Camera 1120 and PBS 1116 may be the same type of components as discussed with reference to of system 100 of FIG. 1. Further, in system 1100, as with system 100 of FIG. 1, local oscillator beam 1136 may be generated by splitting off a portion of a main beam used in generating reference beam 1132.

Like system 100 of FIG. 1, phase retarder 1122 may be used to shift the phase of local oscillator beam 1136 by 90 degrees in order to generate a P image (e.g., un-shifted phase of local oscillator beam 1136) and a Q image (e.g., local oscillator beam 1136 shifted by 90 degrees). The resulting images may then be processed as discussed above with reference FIGS. 1 and 7 to generate a combined image.

Figure 12:
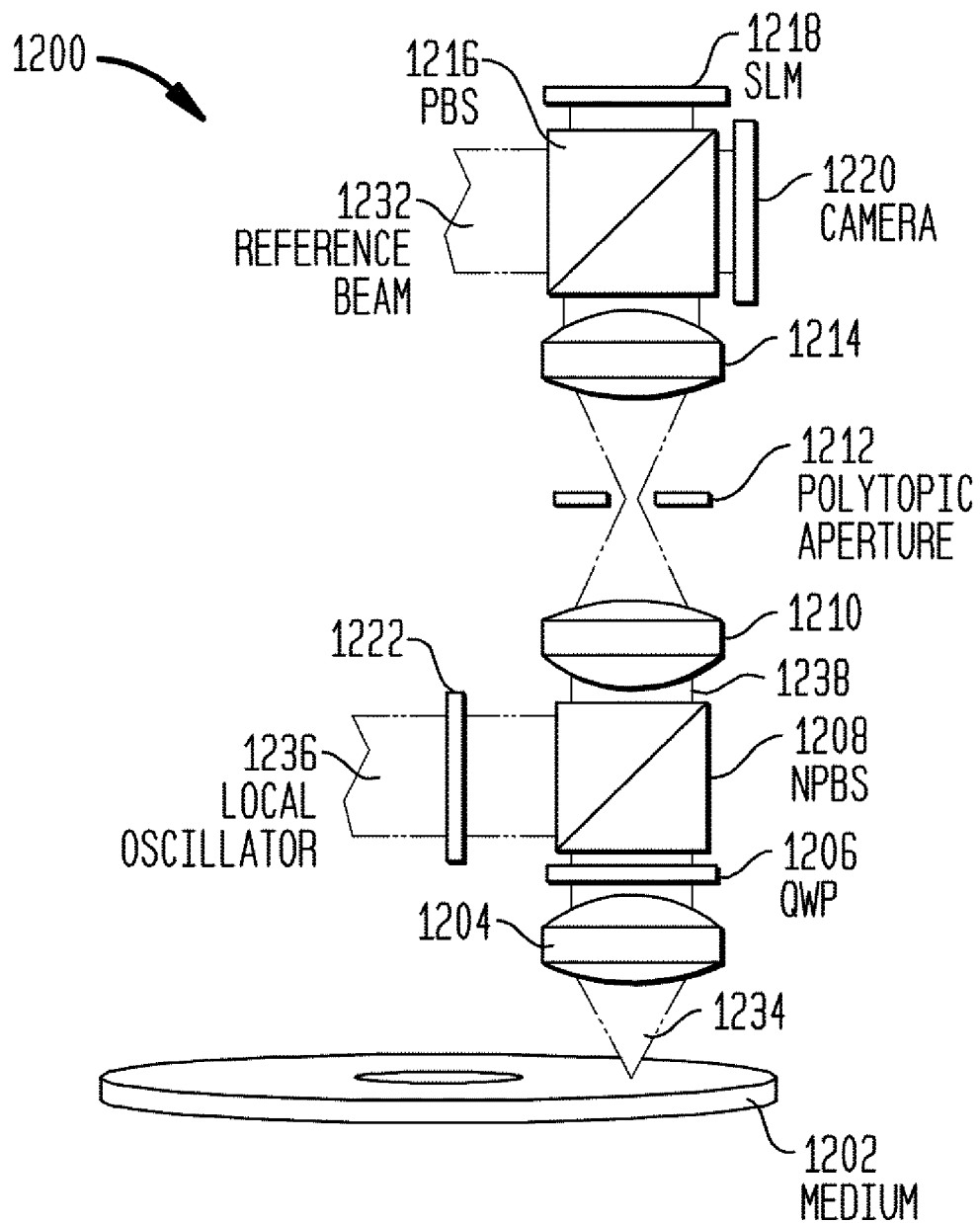
FIG. 12 illustrates an alternate embodiment to the system of FIG. 1 showing an alternate way for introducing the local oscillator beam in a collinear storage geometry, in accordance with embodiments of the invention.

In an alternative embodiment, quadrature homodyne detection may be practiced using other holographic storage architectures or geometries, such as that illustrated in FIG. 12. FIG. 12 illustrates one possible system, referred to generally as 1200, for introducing a local oscillator beam in a collinear storage geometry. As shown, FIG. 12 includes holographic storage medium 1202, a lens 1204, QWP 1206, a NPBS 1208, another lens 1210, polytopic aperture 1212, another lens 1214, a PBS 1216, a SLM 1218, a camera 1220, and another QWP 1222. These components may be the same or similar to those components as discussed above with reference to system 100 of FIG. 1. As one of skill in the art would recognize, holographic memory system 1200 exemplified in FIG. 12 is for illustrative purposes and actual implementation of system 1200 may include numerous additional components without departing from the spirit and scope of the present invention.

In FIG. 12, reference beam 1232 may enter PBS 1216, which, due to the polarization of reference beam 1232, reflects reference beam 1232 towards SLM 1218. As with other collinear storage geometries, SLM 1218 may be set so that the SLM portion of SLM 1218 reflects reference beam 1232 during read operations. Reference beam 1232 may then pass through lens 1214, polytopic aperture 1212, lens 1210, NPBS 1208, QWP 1206 and lens 1204. Lens 1204 may then focus reference beam 1232 into or onto holographic storage medium 1202, which may have a reflective coating located on its backside, thus generating reconstruction data beam 1234 which then passes back through the components in the opposite direction towards PBS 11120.

A local oscillator beam 1236 may be combined with reconstruction data beam 1234 by, for example, NPBS 1208. Like system 100 of FIG. 1 or system 1100 of FIG. 11 described above, local oscillator beam 1236 may be generated by splitting off a portion of a main beam used in generating reference beam 1232. As shown in FIG. 12, local oscillator beam 1236 passes through QWP 1222 (which functions as a phase retarder) prior to being combined with reconstruction data beam 1234 by NBPS 1208. Like system 100 of FIG. 1 or system 1100 of FIG. 11 described above, QWP 1222 may be a FLC QWP that may be switched by a processor (not shown) so that it either allows local oscillator beam 1236 to have its phase left un-shifted or shifted by 90 degrees.

Combined beam 1238 may then pass through lens 1210, polytopic aperture 1212, and lens 1214. Combined beam 1238 may then be reflected by PBS 1216 towards camera 1220, which captures an image of combined beam 1238. In this manner, camera 1220 may capture a P image (e.g., by QWP 1222 not retarding the phase of local oscillator beam 1236) and a Q image (e.g., by QWP 1222 retarding the phase of local oscillator beam 1236 by 90 degrees). The captured P and Q images may then be processed to generate a combined high contrast image, in the same manner as discussed above with reference to FIGS. 1 and 7.

Figure 13:
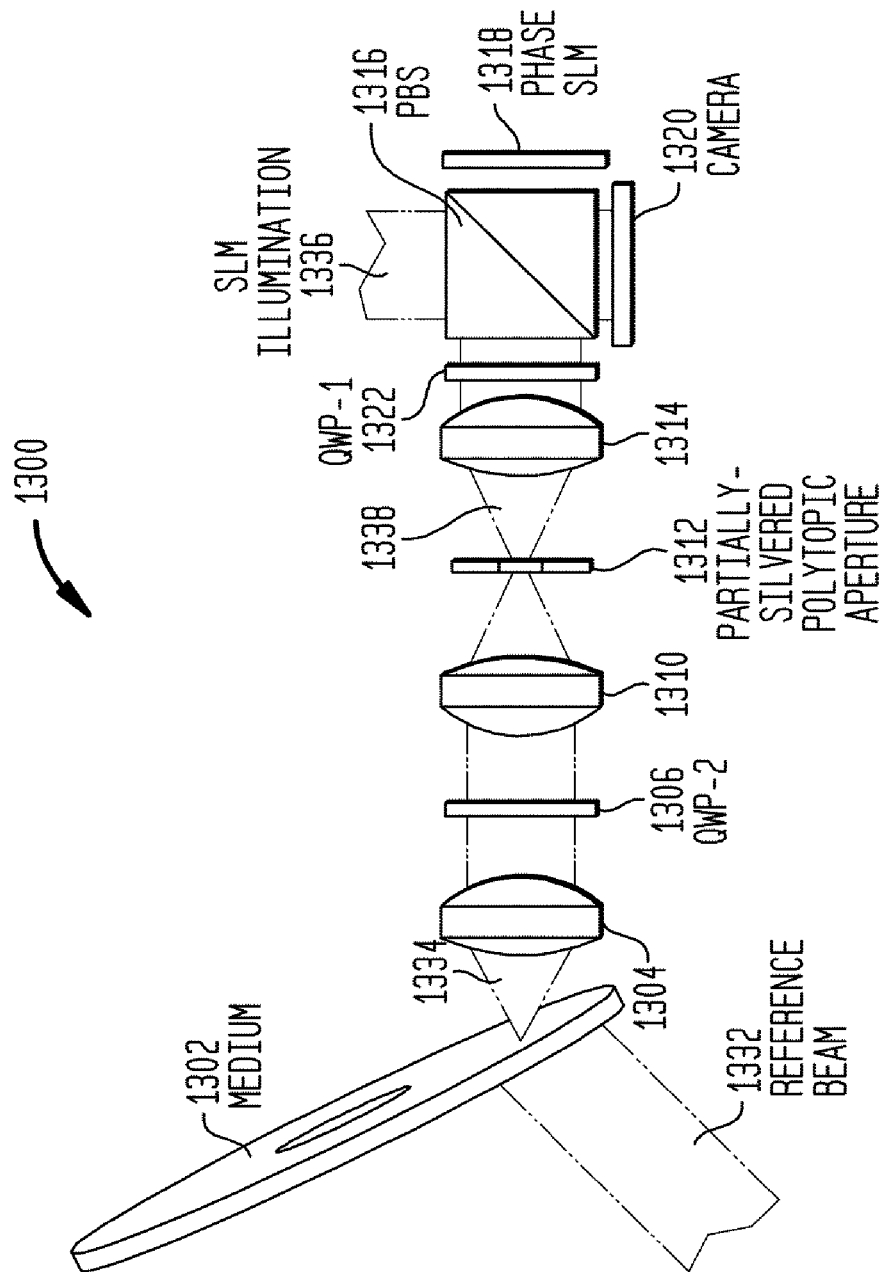
FIG. 13 illustrates an alternate embodiment of the system of FIG. 11 showing an alternate way for introducing a local oscillator beam that may be modulated by the SLM, in accordance with embodiments of the invention.

FIG. 13 illustrates an alternate embodiment of system 100 of FIG. 1 where the local oscillator beam may be introduced through the SLM. As shown in FIG. 13, holographic memory system 1300 includes a holographic storage medium 1302, a lens 1304, a QWP 1306, another lens 1310, a polytopic aperture 1312, another lens 1314, another QWP 1322, a PBS 1316, an SLM 1318, and a camera 1320. These components may be the same or similar to those discussed above with reference to system 100 of FIG. 1. Further, for example, polytopic aperture 1312 may be a partially-silvered polytopic aperture. In holographic memory system 1300, the wavefront of the local oscillator beam 1336 may be adaptively modulated by SLM 1318 (i.e., by the same SLM that is used during a data write) to match the phase carrier of the reconstructed data beam 1334.

The following provides an exemplary description of holographic memory system 1300 for adaptively modulating the local oscillator beam wavefront: During a read operation, s-polarized light (i.e., linear polarization perpendicular to the plane of FIG. 13) in a local oscillator beam 1336 may reflect off the interface in the PBS 1316 and illuminate SLM 1318. SLM 1318 may impart local oscillator beam 1336 with a desired phase modulation pattern, and may then reflect the local oscillator beam 1336 such that beam 1336 has p-polarization. Local oscillator beam 1336 may propagate through PBS 1316 and through QWP 1322, which changes the polarization of local oscillator beam 1336 to circular. Local oscillator beam 1336 may then be focused by lens 1314 downwardly towards partially-silvered polytopic aperture 1312, which may be located in a Fourier plane with respect to SLM 1318. A portion (e.g., about 5%) of local oscillator beam 1336 may be reflected by partially-silvered polytopic aperture 1312, thereby changing the handedness of the circular polarization. The light may then propagate back through QWP 1322, which changes the polarization of the reflected light to linear s-polarized. Local oscillator beam 1336 may then reflect off of the interface within PBS 1320 towards camera 1320, which may be at an image plane with respect to SLM 1318. Thus, the local oscillator beam wavefront appearing on SLM 1318 may be recreated at the camera 1320 (though inverted about the x and y axes).

Concurrently with the local oscillator beam 1336 generation, a reference beam 1332 illuminates holographic storage medium 1302, for example, with a linear s-polarization. The hologram in medium 1302 diffracts light into reconstructed data beam 1334 which may then pass through lens 1304, QWP 1306, and lens 1310 (collectively referred to as a "4F lens relay"). Within this path, QWP 1306 changes the polarization of reconstructed data beam 1334 from linear s to circular, having the same handedness as the local oscillator beam 1336 after reflection off of the partially silvered polytopic aperture 1312. It should be noted that the choice of left or right handedness within the path between QWP 1306 and QWP 1322 is arbitrary. However, the co-propagating signal and local oscillator beams may have the same handedness. Upon striking partially silvered polytopic aperture 1312, some portion of the reconstructed data beam 1334 (for example, about 95%) may be transmitted through and mixed coherently with the local oscillator beam 1336 to form a combined beam 1338. From there, the combined beam 1338 may pass through QWP 1322, which changes the polarization back to linear s-polarization. The combined beam 1338 beam may subsequently reflect off of the PBS 1316 interface towards camera 1320, where it forms an image of the data pattern in superposition with the coherent local oscillator.

Data recovery operations in system 1300 may then be performed using SLM 1318 to adaptively create a local oscillator wavefront in phase with the signal beam phase carrier everywhere across the image, using the algorithms described herein to measure the phase carrier of the signal so that it may be duplicated by the local oscillator beam 1336. For example, at the start of a series of data read operations, SLM 1318 (at the direction of a processor (not shown)) may create a constant phase local oscillator beam 1336 (i.e., the phase of the local oscillator beam 1336 may be the same across its wavefront) that is used to recover a P image of the first hologram by camera 1320 that may then provided to a processor (not shown). A constant local oscillator with a 90 degrees phase difference from the phase of the local oscillator beam 1336 in generating the P image may then be used to recover a Q image by camera 1320 of the same hologram from medium 1302. A map of the signal beam phase carrier may then be determined by processor 1340 using the recovered P and Q images.

For example, the P and Q images may be processed such as described with reference to FIG. 7 to determine the contrast level for each pixel in the recovered P and Q images. Using the determined contrast level for each pixel, a corresponding phase error for each pixel may be determined. For example, if a pixel is determined to have a normalized contrast level of +1 for a particular pixel of the P image, the phase error may be determined to be 0. Similarly, if a normalized contrast level of +1 is determined for a particular pixel of the Q image, the phase error may be determined to be 90 degrees. Likewise if a particular pixel is determined to have a normalized contrast level of −1 for the P image, then the phase error may be determined to be 180 degrees. Further, if a normalized contrast level of ½ (i.e., 0.5) is determined for a pixel of the P image and a normalized contrast level of ½ (i.e., 0.5) is determined for the same pixel of the Q image, a phase error of 45 degrees may be determined. For example, this phase error may be calculated where the phase error=arctan 2(Q,P), where arctan 2 is the four quadrant inverse tangent function.

The processor (not shown) may then use the determined phase error map to direct SLM 1318 of system 1300 to effect or cause respective phase shifts by each corresponding pixel of SLM 1318 to generate a wavefront of local oscillator beam 1336 that will be phase matched in time and space with the phase carrier of reconstructed data beam 1334. Thus, a high contrast image of the hologram may be recovered with a single image exposure by SLM 1318. The processor (not shown) may then repeatedly use the same wavefront to recover a sequence of holograms since the recording and recovery conditions of neighboring holograms will be similar, and their phase carriers will be substantially identical.

Additionally, in another embodiment of system 1300, the processor (not shown) further uses an adaptive algorithm to make small changes in the local oscillator wavefront by adjusting the phases of the pixels of SLM 1318 in order to track the changes in the phase carriers of subsequent holograms that occur as the conditions of recording and recovery diverge from the conditions when the original phase carrier was measured. As an example of such an algorithm, the processor (not shown) may deliberately introduce a small alternating constant phase offset in the wavefront of local oscillator beam 1. For example, the processor (not shown) may use a +15° phase advance for the whole local oscillator pattern for a first hologram recovery, and a −15° phase retardation for the next hologram recovery. Such small phase perturbations may only very slightly degrade the SNR of the two images, and thus they may still be recovered. However, these small phase perturbations would introduce a slight reserved block cross-correlation peak sum intensity modulation indicating the gradient of the absolute phase difference between the local oscillator beam 1336 and the reconstructed data beam's 1334 phase carrier. Where the cross correlation peak sums from the phase advanced and retarded images have equal intensity, the phase difference will be zero. However, where the phase advanced and retarded images cross-correlation peak sums have unequal intensity, the local oscillator beam 1336 has a phase error which may be reduced towards zero by adjusting the phase in the direction (advancement or retardation) that gave the stronger cross correlation peaks. By means of such a "wobble servo," the processor (not shown) may recover long sequences of holograms with only a single exposure apiece, even while the phase carriers of the individual holograms were changing over the sequence. In an alternative embodiment, the optical path that images SLM 1318 onto camera 1320 could be different. For example, instead of a partially silvered surface within polytopic aperture 1312, a partially-silvered surface could be placed between QWP 1306 and lens 1310 in the common focal plane of lens 1304 and lens 1310. This surface would also reflect a portion of local oscillator beam 1336 to form an image of SLM 1318 upon camera 1320. As such, in this example, the partially silvered QWP would function as a beam combiner for combining the local oscillator beam 1336 and the reconstructed data beam 1334 to form combined beam 1338.

Figure 14:
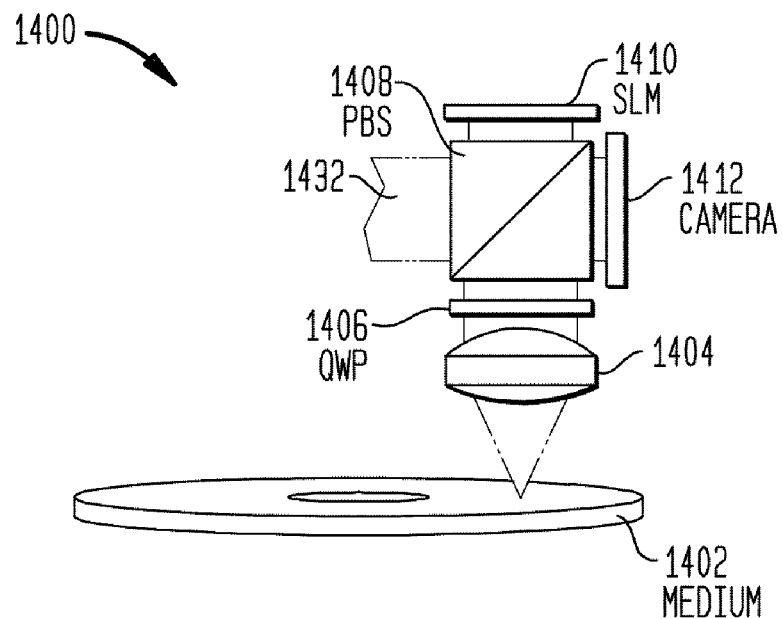
FIG. 14 illustrates an alternate embodiment of the system of FIG. 12 showing an alternate way for introducing the local oscillator beam for collinear holography, in accordance with embodiments of the invention.

FIG. 14 illustrates alternate embodiment of the system of FIG. 12 showing an alternate way for introducing the local oscillator beam for collinear holography. System 1400 of FIG. 14 differs from the geometries of prior systems 100, 1100, 1300 and especially 1200 in that the SLM itself is used to generate both the reference and local oscillator beams. The reference pattern comes from a region of the SLM reserved for the reference beam as practiced in other collinear recording, and the local oscillator beam comes from an area of the SLM that is used for the data pattern during recording.

As shown in FIG. 14, holographic storage medium 1400 includes a holographic storage medium 1402, a lens 1404, a QWP 1406, a PBS 1408, an SLM 1410, and a camera 1412. These components may be, for example, the same type of components discussed above with reference to FIG. 1. It should be noted that holographic memory system 1400 is for illustrative purposes, and actual implementation of system 1400 may comprise additional components.

Figure 15:
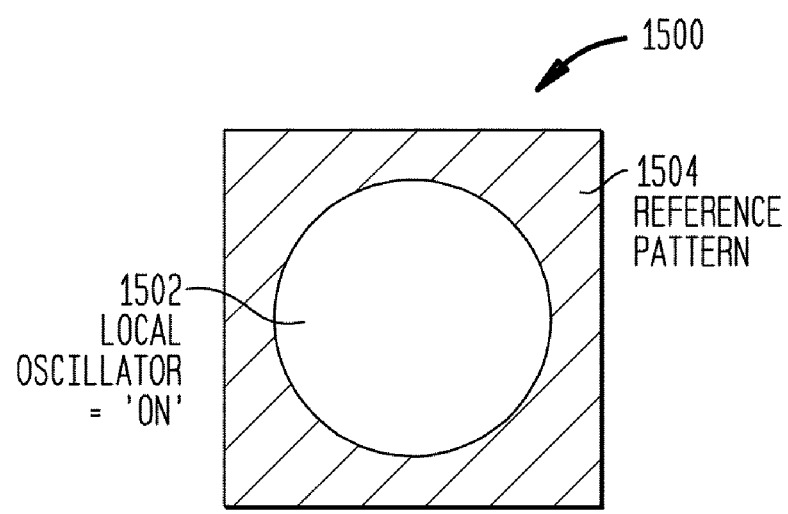
FIG. 15 illustrates an exemplary SLM format for use in read operations, in accordance with embodiments of the invention.

In a read operation using system 1400, a reference beam 1432 may be directed towards PBS 1408. Reference beam 1432 may be a coherent light beam and of the same or similar type as the reference beam used in writing data to holographic storage medium 1402. Reference beam 1432 may also be referred to as an SLM illumination beam. PBS 1408 reflects reference beam 1432 towards SLM 1410, which may be used to generate a particular pattern. FIG. 15 illustrates an exemplary format for SLM 1410 for use in read operations. As shown in FIG. 15, SLM pattern 1500 may include a central circular local oscillator portion 1502 and an outside reference pattern portion 1504. In other collinear read operations, the local oscillator portion 1502 may be set so that all pixels in this portion are off. In the embodiment shown in FIG. 15, however, local oscillator portion 1502 may be set so that portion 1502 reflects a portion of reference beam 1432 that functions as a local oscillator beam.

A further description of how the pixels of local oscillator portion 1502 may be set is provided below. Reference pattern portion 1504 may be set so that its pixels are set in the same manner used during writing the hologram. In one example, in order to generate the Q and P images, holographic memory system 1400 may use a switchable phase element, such as an QWP (not shown) in the SLM illumination path that generates the two desired phase profiles (e.g., the local oscillator region is changed by 90 degrees while the reference region remains unchanged) and images them onto the SLM. This example may be used such that a Q image may be captured where the QWP (not shown) is set such that it leaves the local oscillator portion 1504 of the reference beam 1432 unchanged and a P image may be captured by setting the QWP (not shown) such that it changes the local oscillator portion 1504 of the reference beam 1432 by 90 degrees and leaves the reference region portion 1502 unchanged. The Q and P images may then be processed, such as described above with reference to FIG. 7 to generate a combined image.

In another example, SLM 1410 of FIG. 14 may be an SLM capable of producing the 90 degree phase shift in the local oscillator portion 1502 (e.g., a phase-modulating SLM with better than binary phase resolution). This system may function similar to the above-described embodiment of FIG. 13. For example, an initial P image may be captured by camera 1412 where all pixels in the local oscillator portion 1502 are set to modify the reference beam 1432 by a particular phase. The phase shift of the local oscillator portion 1502 may then be shifted by 90 degrees and a Q image captured. These captured P and Q images may then be processed such as described above with reference to FIG. 13 to determine a corresponding phase error for each pixel. Using this determined phase error information, a phase shift for each pixel in the local oscillator portion 1502 of SLM 1410 may then be determined. For example, for pixels in the local oscillator portion 1502 that are determined to be high contrast may be set such that these pixels cause the same phase shift as during the initial image capture, while those pixels with low contrast are set such that those pixels cause a 90 degree phase shift from the phase shift during the initial capture. That is, the phase shift for each pixel in the local oscillator portion 1504 may be set in accordance with the determined phase error for the respective pixel so that all pixels will result in a high contrast image when captured by camera 1412.

By individually setting the phase shift for each pixel of local oscillator portion 1404, it may not be necessary to generate the P and Q images, and instead one initial setting may be determined that is periodically checked and adjusted to ensure a high contrast image is being captured by camera 1412. Homodyne recovery may then be performed with a single camera exposure without the need for the quadrature recombination procedure. Alternatively, homodyne recovery may then be performed with a single camera exposure by means of a wobble servo as previously described.

Additionally, in the embodiment of FIG. 15, it may also be desirable to modulate the region-wise amplitude as well as the phase for each pixel. For example, the processor (not shown) in processing the image may determine relative intensity levels for each pixel of the high contrast image. This determined relative intensity level information may then be used to boost the intensity of pixels with low intensities and/or retard the intensity of those pixels with high intensities. For example, if a pixel that is "on" is found to have a +1 intensity that is higher than the intensity of another +1 pixel, the intensities of these pixels may be adjusted by the processor (not shown) to direct the SLM to effect a corresponding increase or decrease in the intensity of the corresponding pixel. This may be accomplished for example, using separate, cascaded phase and amplitude SLMs. Adjusting the relative intensity levels of each pixel may aid in obtaining an image with a more homogenous intensity level and help increase the SNR for the recovered data.

Figure 16:
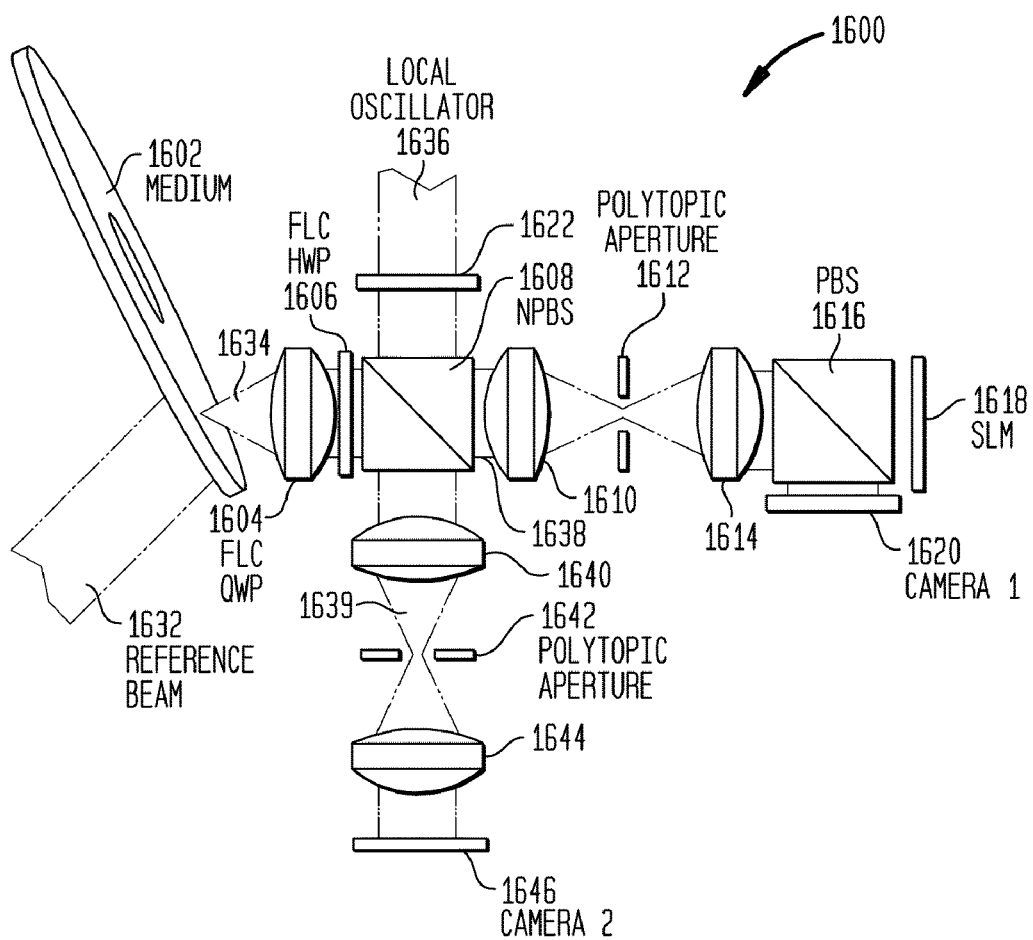
FIG. 16 illustrates an alternate embodiment of the system of FIG. 1 for introducing a local oscillator beam involving two cameras, in accordance with embodiments of the invention.

FIG. 16 illustrates an alternate embodiment of the system of FIG. 1 for introducing a local oscillator beam involving two cameras, which is generally referred to as holographic memory system 1600. System 1600 is identical to system 100 of FIG. 1 with the exception that in system, two combined beams 1638 and 1639 are generated. For simplification, only the components of the holographic memory system 1600 in the light path between the storage medium 1602 and the camera 1620 are shown in FIG. 16. In actual implementation, the holographic memory system 1600 may include numerous other components, such as, for example, a light source, mirrors, additional beam splitters, etc.

As shown in FIG. 16, holographic memory system 1600 includes a holographic storage medium 1602, a lens 1604, a HWP 1606, a NPBS 1608, another lens 1610, a polytopic aperture 1612, another lens 1614, a PBS 1616, a SLM 1618, a camera 1620, as well as a QWP 1622, another lens 1640, a second polytopic aperture 1642, another lens 1644, and a second camera 1646. In system 1600, the local oscillator beam 1636 and reconstructed data beam 1634 (generated by passing reference beam 1632 through medium 6102) may be combined by NPBS 1608 to form a combined beam 1638, as in system 100 of FIG. 1, with combined beam 1638 being be processed in the same or similar manner as discussed above with reference to system 100 of FIG. 1. Further, in system 1600, NPBS 1608 may include a partially reflective coating that reflects about 50% of incident light while allowing the remaining about 50% incident light to pass through NPBS 1608.

In system 100 of FIG. 1, the portion of the reconstructed data beam 134 reflected by NPBS 108 is not used. In system 1600 of FIG. 16, however, this portion of reconstructed data beam 1634 reflected by NPBS 1608 may be combined with the portion of local oscillator beam 1636 passing through NPBS 1608 to form a second combined beam 1639. This second combined beam 1639 may then pass through lens 1640, a second polytopic aperture 1642, and another lens 1644. These components may be the same or similar to the components used in the path of combined beam 1638. An image of the second combined beam 1639 may then be captured by second camera 1646.

In system 1600 of FIG. 16, two separate Q images may be captured with one captured by camera 1620 and the second by camera 1646. Likewise, two separate P images may be captured. These Q and P images may be processed to produce two separate combined images using methods such as discussed above with reference to FIG. 7. These two combined images may then be combined to produce an even higher quality image, such as, for example, by taking the difference of the two images after resampling.

It should be noted that the systems 100, 1100, 1200, 1300, 1400 and 1600 described above are exemplary only and that exemplary systems may be modified or other systems used without departing from spirit and scope of the present invention. For example, it may not necessary to use a relay lens (e.g., lenses 110 and 114) and/or a polytopic filter.

The following provides an explanation of some of the mathematics illustrating some of the benefits of using homodyne detection such as described above. For conventional non-homodyne detection, the irradiance pattern may be represented as impinging upon the detector as:

$$I_{cam}(x, y) = |E_S(x, y) + E_N(x, y)|^2 \quad (1)$$
$$= |E_S|^2 + |E_N|^2 + 2|E_S||E_N|\cos\phi_{S-N},$$

where $E_S(x,y)$ and $E_N(x,y)$ are the scalar complex amplitudes of the holographic signal and the coherent optical noise, respectively. The relative phase difference between the two fields, $\phi_{S-N}$, is a random variable, so the cos factor in the final term swings between +1 and −1 randomly. This term, which has the signal multiplied by the noise rather than adding to it, is a major limiting noise factor in the practical development of holographic data storage.

For homodyne detection, the expression may become:

$$I_{homo} = |E_{LO} + E_S + E_N|^2 \qquad (2)$$
$$= |E_{LO}|^2 + |E_S|^2 + |E_N|^2 +$$
$$2|E_{LO}||E_S|\cos\phi_{LO-S} +$$
$$2|E_{LO}||E_N|\cos\phi_{LO-N} +$$
$$2|E_S||E_N|\cos\phi_{S-N},$$

where $E_{LO}$ is the complex amplitude of the local oscillator. Since we will use a strong local oscillator to produce a lot of optical gain, we may safely postulate $|E_{LO}|>>|E_S|$ and $|E_{LO}|>>|E_N|$, so that terms not involving $E_{LO}$ become negligible. Thus, $$I_{homo}(x, y) \cong |E_{LO}|^2 + 2|E_{LO}||E_S|\cos\phi_{LO-S} + \qquad (3)$$
$$2|E_{LO}||E_N|\cos\phi_{LO-N}$$
$$= |E_{LO}|^2 + 2|E_{LO}|[\pm|E_S| + |E_N|\cos\phi_{LO-N}].$$

In equation (3), $\cos\phi_{LO-S} = \pm 1$ is used since the quadrature recombination process has forced $\cos\phi_{LO-S}$ to match the data polarity throughout the image. Thus, the detected signal may comprise a gain-enhanced signal and additive noise, and a constant background term. As shown in equation (3), the troublesome multiplicative noise term has vanished, and the signal term may be proportional to the optical field rather than the irradiance.

Figure 17:
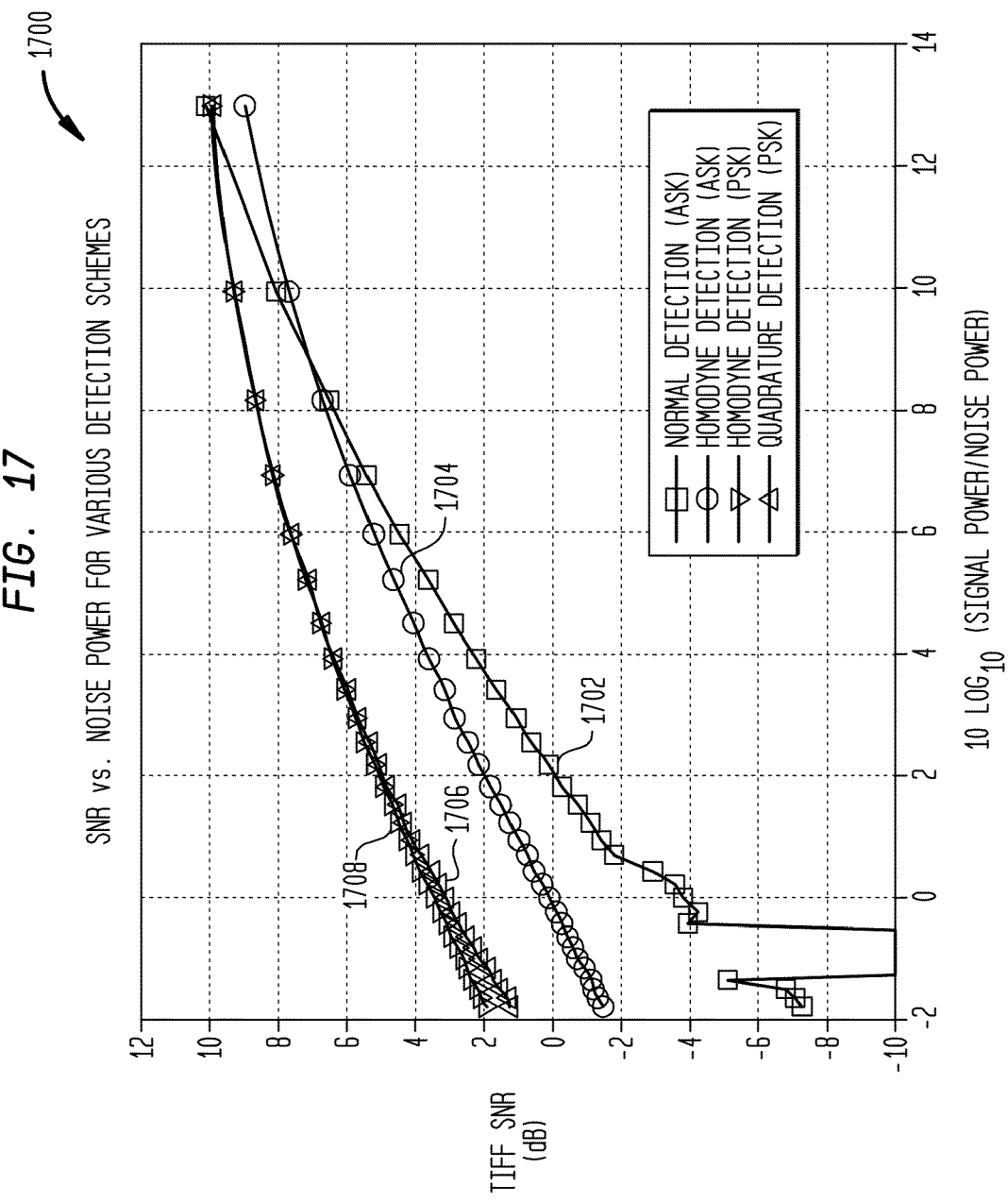
FIG. 17 illustrates an exemplary simulated plot of SNR versus Noise Power for homodyne and non-homodyne detection for systems employing phase shift keying (PSK) and amplifying shift keying (ASK) data recordation schemes, in accordance with embodiments of the invention.

The improvement in performance may be quantified by simulating the effects of noise on holograms detected with and without homodyne detection. FIG. 17 illustrates an exemplary simulated plot 1700 of the SNR versus Noise Power for homodyne and non-homodyne detection for systems employing the PSK and ASK data recordation schemes. It should be noted that this simulated plot is provided to illustrate some of the potential benefits of the embodiments of the present invention. The horizontal axis indicates the amount of coherent noise added to the nominally noise-free holographic image, and the vertical axis is the detection channel output SNR (after homodyne recombination, where necessary, and resampling).

Curve 1702 represents ordinary detection of a simulated hologram using ASK. Curve 1704 represents the same hologram detected with an ideal local oscillator that is phase matched in time and space with the phase carrier of the reconstructed data beam, with power 100 times that of the hologram. Curve 1706 illustrates a PSK modulated hologram with an ideal local oscillator that is phase matched in time and space with the phase carrier of the reconstructed data beam. Curve 1708 illustrates a curve for quadrature homodyne detection, as described herein, of a detected PSK modulated hologram, such as the one discussed above with reference to FIGS. 5, 6, and 10. As can be seen in FIG. 17, for a given required output SNR (say, 2 dB), the ASK homodyne detector may tolerate about 2 dB more input noise, and the PSK curves may tolerate about 3 dB beyond that. It should be noted that these curves shown in FIG. 17 are simulated curves. Although the normal detection curve 1702 in FIG. 17 eventually catches up to the homodyne curves 1704, 1706 and 1708 at high SNR, this may be due to the resampling method in the simulation, and not the regime that a real system would operate in. As shown in FIG. 17, the quadrature homodyne curve 1708 closely tracks the ideal PSK homodyne curve until very high levels of noise start to degrade the quality of the P and Q phase carrier estimates.

Thus, PSK quadrature homodyne may provide a ~5 dB of improvement compared to normal detection, while at the same time increasing the potential transfer rate (by decreasing exposure times) and equalizing the holographic write illumination (e.g., eliminating the D.C. hot spot). Using PSK quadrature homodyne detection may ultimately permit greater storage densities by permitting many weaker holograms to be stored in a recoverable fashion.

In addition to homodyne detection, embodiments of the present invention may also be used for or with heterodyne detection. For heterodyne detection, the local oscillator beam may have a phase carrier with a different frequency than the phase carrier of the reconstructed data beam. Heterodyne detection may be accomplished, for example, by frequency shifting the local oscillator beam using an acousto-optic modulator, in place of the switchable quarter wave plate. In the case of heterodyne detection, the intensity of each detected pixel may be modulated in time at a rate equal to the frequency difference between the reconstructed data beam and the local oscillator beam, and the phase of this modulated combined beam will be determined by the phase difference between the reconstructed data beam and the local oscillator beam. A processor may capture enough of the modulated waveforms (~one cycle) to determine their amplitude and phase. By then applying the cross-correlation peak detection method discussed above with reference to FIG. 7 at some reference time-slice within the page-wide waveform, the processor may determine the absolute phase difference with respect to the local oscillator at each pixel position, and thus extract the data from the detected signal by conventional heterodyne processing.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for use with a storage medium that holographically stores information, the method comprising the following steps:
   (a) generating a combined beam comprising a local oscillator portion and a reference pattern portion;
   (b) causing the combined beam to contact the storage medium to thereby generate a reconstructed data beam;
   (c) obtaining an image from the reconstructed data beam;
   (d) processing the obtained image to provide image contrast information; and
   (e) modifying the local oscillator portion of the combined beam based on the image contrast information;
   wherein the combined beam comprising a local oscillator portion and a reference pattern portion is formed using a format where a first portion of the format is used for forming the local oscillator portion and a second portion of the format is used for forming the reference pattern portion;
   wherein in generating the combined beam, the reference pattern portion comprises a reference pattern corresponding to a reference pattern used in holographically storing the information; and wherein modifying at least one pixel comprises: directing the at least one pixel to effect a phase shift in at least a portion of the combined beam based on the determined contrast for the at least one pixel.

2. The method of claim 1, wherein generating a combined beam comprises:

reflecting at least a portion of the local oscillator beam by a beam combiner; and directing the reconstructed data beam to the beam combiner such that at least a portion of the reconstructed data beam passes through the beam combiner and combines with the portion of the local oscillator beam reflected by the beam combiner.

3. The method of claim 2, wherein the beam combiner comprises a partially reflective surface.

4. The method of claim 3, wherein the partially reflective surface is in a fourier plane or an image plane of the phase modulation pattern.

5. The method of claim 2, wherein generating a local oscillator beam comprising a phase modulation pattern, comprises:

directing the local oscillator beam towards a spatial light modulator (SLM) which imparts the local oscillator beam with a desired phase modulation pattern.

6. The method of claim 2, wherein the holographic storage medium stores a hologram of a data page comprising a plurality of pixels and wherein the data page comprises a plurality of reserved blocks, wherein each reserved block comprises a known pixel pattern, and wherein processing the obtained image to provide image contrast information further comprises: determining information regarding a contrast for at least one of the plurality of reserved blocks.

7. The method of claim 6, and wherein processing the obtained image to provide image contrast information further comprises:

interpolating a contrast for a pixel not included in a reserved block using the information determined regarding a contrast for at least one of the plurality of reserved blocks.

8. The method of claim 6, wherein determining information regarding a contrast for at least one of the plurality of reserved blocks comprises:

calculating a cross-correlation, using an expected pattern, over a region comprising a subset of pixels of the data page.

9. A system for use with a storage medium that holographically stores information, the system comprising:

means for generating a combined beam comprising a local oscillator portion and a reference pattern portion;

means for causing the combined beam to contact the storage medium to thereby generate a reconstructed data beam;

means for obtaining an image from the reconstructed data beam;

means for processing the obtained image to provide image contrast information; and means for modifying the local oscillator portion of the combined beam based on the image contrast information;

wherein the means for modifying the local oscillator portion, comprises: means for modifying at least one pixel in the local oscillator portion of the reference pattern based on the determined contrast determined for the at least one pixel; and wherein the means for modifying the at least one pixel, comprises: means for directing the at least one pixel to effect a phase shift in at least a portion of the combined beam based on the determined contrast for the at least one pixel.

10. The system of claim 9, further comprising:

means for determining an adjusted intensity level for each pixel of the data page by, for each pixel in the data page, performing the steps of multiplying and determining an adjusted intensity level for the pixel.

11. The system of claim 9, wherein the storage medium stores a hologram of a data page comprising a plurality of pixels and wherein the data page comprises a plurality of reserved blocks, wherein each reserved block comprises a known pixel pattern, wherein the means for processing the obtained image to provide image contrast information comprises:

means for determining information regarding a contrast for at least one of the plurality of reserved blocks.

12. A system for use with a storage medium that holographically stores information, the system comprising:

means for generating a combined beam comprising a local oscillator portion and a reference pattern portion;

means for causing the combined beam to contact the storage medium to thereby generate a reconstructed data beam;

means for obtaining an image from the reconstructed data beam;

means for processing the obtained image to provide image contrast information; and means for modifying the local oscillator portion of the combined beam based on the image contrast information;

wherein the holographic storage medium stores a hologram of a data page comprising a plurality of pixels and wherein the data page comprises a plurality of reserved blocks, wherein each reserved block comprises a known pixel pattern, wherein the means for processing the obtained image to provide image contrast information comprises: means for determining information regarding a contrast for at least one of the plurality of reserved blocks;

wherein the means for processing the obtained image to obtain contrast information further comprises: means for interpolating a contrast for a pixel not included in a reserved block using the information determined regarding a contrast for at least one of the plurality of reserved blocks.

13. A system for use with a storage medium that holographically stores information, the system comprising:

means for generating a combined beam comprising a local oscillator portion and a reference pattern portion;

means for causing the combined beam to contact the storage medium to thereby generate a reconstructed data beam;

means for obtaining an image from the reconstructed data beam;

means for processing the obtained image to provide image contrast information; and means for modifying the local oscillator portion of the combined beam based on the image contrast information;

wherein the holographic storage medium stores a hologram of a data page comprising a plurality of pixels and wherein the data page comprises a plurality of reserved blocks, wherein each reserved block comprises a known pixel pattern, wherein the means for processing the obtained image to provide image contrast information comprises: means for determining information regarding a contrast for at least one of the plurality of reserved blocks;

wherein the means for determining information regarding a contrast for at least one of the plurality of reserved blocks comprises: means for calculating a cross-correlation, using an expected pattern, over a region comprising a subset of pixels of the data page.

14. A method for use with a storage medium that holographically stores information, the method comprising the following steps:
  (a) generating a combined beam comprising a local oscillator portion and a reference pattern portion, the combined beam being generated away from the storage medium;
  (b) causing the combined beam to contact the storage medium to thereby generate a reconstructed data beam;
  (c) obtaining an image from the reconstructed data beam;
  (d) processing the obtained image to provide image contrast information; and
  (e) modifying the local oscillator portion of the combined beam based on the image contrast information,
  wherein the combined beam comprising a local oscillator portion and a reference pattern portion is formed using a format where a first portion of the format is used for forming the local oscillator portion and a second portion of the format is used for forming the reference pattern portion,
  wherein in generating the combined beam, the reference pattern portion comprises a reference pattern corresponding to a reference pattern used in holographically storing the information,
  wherein modifying at least one pixel comprises: directing at least one pixel to effect a phase shift in at least a portion of the combined beam based on the determined contrast for the at least one pixel.

15. The method of claim 14, wherein generating a combined beam comprises:
  reflecting at least a portion of the local oscillator beam by a beam combiner; and
  directing the reconstructed data beam to the beam combiner such that at least a portion of the reconstructed data beam passes through the beam combiner and combines with the portion of the local oscillator beam reflected by the beam combiner.

16. The method of claim 15, wherein the beam combiner comprises a partially reflective surface.

17. The method of claim 16, wherein the partially reflective surface is in a fourier plane or an image plane of the phase modulation pattern.

18. The method of claim 15, wherein generating a local oscillator beam comprising a phase modulation pattern, comprises:
  directing the local oscillator beam towards a spatial light modulator (SLM) which imparts the local oscillator beam with a desired phase modulation pattern.

19. The method of claim 15, wherein the holographic storage medium stores a hologram of a data page comprising a plurality of pixels and wherein the data page comprises a plurality of reserved blocks, wherein each reserved block comprises a known pixel pattern, and wherein processing the obtained image to provide image contrast information further comprises: determining information regarding a contrast for at least one of the plurality of reserved blocks.

20. The method of claim 19, and wherein processing the obtained image to provide image contrast information further comprises:
  interpolating a contrast for a pixel not included in a reserved block using the information determined regarding a contrast for at least one of the plurality of reserved blocks.

21. The method of claim 19, wherein determining information regarding a contrast for at least one of the plurality of reserved blocks comprises:
  calculating a cross-correlation, using an expected pattern, over a region comprising a subset of pixels of the data page.

22. A system for use with a storage medium that holographically stores information, the system comprising:
  means for generating a combined beam comprising a local oscillator portion and a reference pattern portion, said means for generating a combined beam disposed away from said storage medium;
  means for causing the combined beam to contact the storage medium to thereby generate a reconstructed data beam;
  means for obtaining an image from the reconstructed data beam;
  means for processing the obtained image to provide image contrast information; and
  means for modifying the local oscillator portion of the combined beam based on the image contrast information,
  wherein the means for modifying the local oscillator portion, comprises:
  means for modifying at least one pixel in the local oscillator portion of the reference pattern based on the determined contrast determined for the at least one pixel,
  wherein the means for modifying the at least one pixel, comprises: means for directing the at least one pixel to effect a phase shift in at least a portion of the combined beam based on the determined contrast for the at least one pixel.

23. A system for use with a storage medium that holographically stores information, the system comprising:
  means for generating a combined beam comprising a local oscillator portion and a reference pattern portion, said means for generating a combined beam disposed away from said storage medium;
  means for causing the combined beam to contact the storage medium to thereby generate a reconstructed data beam;
  means for obtaining an image from the reconstructed data beam;
  means for processing the obtained image to provide image contrast information; and
  means for modifying the local oscillator portion of the combined beam based on the image contrast information,
  wherein the holographic storage medium stores a hologram of a data page comprising a plurality of pixels and wherein the data page comprises a plurality of reserved blocks, wherein each reserved block comprises a known pixel pattern, wherein the means for processing the obtained image to provide image contrast information comprises:
  means for determining information regarding a contrast for at least one of the plurality of reserved blocks,
  wherein the means for processing the obtained image to obtain contrast information further comprises: means for interpolating a contrast for a pixel not included in a reserved block using the information determined regarding a contrast for at least one of the plurality of reserved blocks.

24. A system for use with a storage medium that holographically stores information, the system comprising:
- means for generating a combined beam comprising a local oscillator portion and a reference pattern portion, said means for generating a combined beam disposed away from said storage medium;
- means for causing the combined beam to contact the storage medium to thereby generate a reconstructed data beam;
- means for obtaining an image from the reconstructed data beam;
- means for processing the obtained image to provide image contrast information; and
- means for modifying the local oscillator portion of the combined beam based on the image contrast information,
- wherein the holographic storage medium stores a hologram of a data page comprising a plurality of pixels and wherein the data page comprises a plurality of reserved blocks, wherein each reserved block comprises a known pixel pattern, wherein the means for processing the obtained image to provide image contrast information comprises:
- means for determining information regarding a contrast for at least one of the plurality of reserved blocks,
- wherein the means for determining information regarding a contrast for at least one of the plurality of reserved blocks comprises: means for calculating a cross-correlation, using an expected pattern, over a region comprising a subset of pixels of the data page.

* * * * *